United States Patent [19]

Katsurada et al.

[11] Patent Number: 5,359,677
[45] Date of Patent: Oct. 25, 1994

[54] IMAGE READER AND FACSIMILE MACHINE USING SUCH IMAGE READER

[75] Inventors: Morihiro Katsurada; Sadaaki Shimonaga, both of Nara, Japan

[73] Assignee: Sharp Kabushiki Kaisha, Osaka, Japan

[21] Appl. No.: 802,649

[22] Filed: Dec. 9, 1991

[30] Foreign Application Priority Data

Dec. 11, 1990 [JP] Japan ............... 2-401420

[51] Int. Cl.$^5$ ............................................. G06K 9/32
[52] U.S. Cl. ........................................ 382/58; 382/46; 358/488
[58] Field of Search .............. 382/45, 46, 56, 58; 358/426, 261.1, 261.3, 427, 453, 488; 340/727; 395/137

[56] References Cited

U.S. PATENT DOCUMENTS

| | | | |
|---|---|---|---|
| 4,387,435 | 6/1983 | Arai et al. | 358/488 |
| 4,533,959 | 8/1985 | Sukurai | 382/46 |
| 4,637,057 | 1/1987 | Kermisch | 382/46 |
| 4,759,076 | 7/1988 | Tanaka et al. | 382/46 |
| 4,783,834 | 11/1988 | Anderson et al. | 382/46 |
| 4,792,981 | 12/1988 | Cahill, III et al. | 382/56 |
| 4,817,178 | 3/1989 | Momose et al. | 382/46 |
| 4,829,452 | 5/1989 | Kang et al. | 364/518 |
| 4,866,784 | 9/1989 | Barski | 382/46 |
| 4,912,559 | 3/1990 | Ariyoshi et al. | 358/261.1 |
| 4,941,189 | 7/1990 | Britt | 382/46 |
| 4,953,230 | 8/1990 | Kurose | 358/488 |
| 4,985,930 | 1/1991 | Takeda et al. | 382/56 |
| 5,027,227 | 6/1991 | Kita | 358/488 |
| 5,093,653 | 3/1992 | Ikehira | 340/727 |
| 5,191,438 | 3/1993 | Katsurada et al. | 358/426 |

FOREIGN PATENT DOCUMENTS

| | | |
|---|---|---|
| 0431962 | 6/1991 | European Pat. Off. . |
| 0432723 | 6/1991 | European Pat. Off. . |
| 55-154871 | 12/1980 | Japan . |
| 58-114563 | 7/1983 | Japan . |
| 60-15364 | 8/1985 | Japan . |
| 62-206962 | 9/1987 | Japan . |
| 63-88963 | 4/1988 | Japan . |
| 2-215269 | 8/1990 | Japan . |

Primary Examiner—Leo H. Boudreau
Assistant Examiner—Chris Kelley
Attorney, Agent, or Firm—Nixon & Vanderhye

[57] ABSTRACT

An image reader includes a scanner for reading a two-dimensional image and converting the read data into two-dimensional image data, a memory for storing the two-dimensional image data, correction circuit for correcting the two-dimensional image data so that the direction of character strings included in the two-dimensional image data coincides with the main scanning direction, and a coding circuit for reading the corrected two-dimensional image data from the memory in the order along the main scanning direction. The facsimile machine includes such an image reader, and a transmission circuit for transmitting the coded image data to another facsimile machine.

17 Claims, 23 Drawing Sheets

FIG.3 PRIOR ART

| WHITE RUN LENGTH | CODE | BLACK RUN LENGTH | CODE |
|---|---|---|---|
| 0 | 00110101 | 0 | 00001101111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| ... | ... | ... | ... |
| 59 | 01001010 | 59 | 00000001011 |
| 60 | 01001011 | 60 | 00000001100 |
| 61 | 00110010 | 61 | 000001011010 |
| 62 | 00110011 | 62 | 000001100110 |
| 63 | 00110100 | 63 | 000001100111 |

FIG. 4 PRIOR ART

| WHITE RUN LENGTH | CODE | BLACK RUN LENGTH | CODE |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| ... | ... | ... | ... |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |

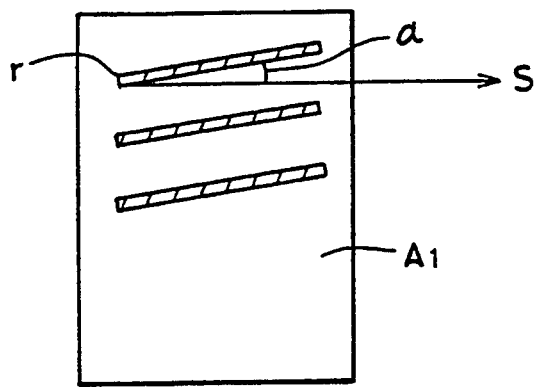
FIG.13 (1)
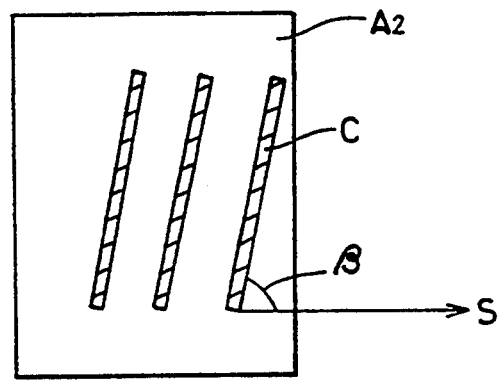
FIG.13 (2)

IMAGE READER AND FACSIMILE MACHINE USING SUCH IMAGE READER

BACKGROUND OF THE INVENTION

1. Field of the Invention

The present invention relates to an image reader capable of reading printed images, etc. by sequentially scanning the same in a predetermined direction and compressing the read image data by coding the same. The present invention further relates to a facsimile machine having such an image reader.

2. Description of the Related Art

In recent years, facsimile machines play a significantly important role in the field of data communication. A facsimile machine reads an image printed on a sheet of paper, a hand-written image, etc. by a scanner formed of, for example, CCD (Charge-Coupled Device) image sensor and converts the read image into a digital signal. The digital signal is converted into a compressed digital signal by a coding system such as MH (Modified Huffman), MR (Modified READ), MMR (Modified MR), etc. The compressed digital signal is converted into an analog signal and output to a telephone line.

FIG. 1 is a representation showing the principle reading an original in a facsimile machine recommended by CCITT (International Telegraph and Telephone Consultative Committee). Referring to FIG. 1, an original 10 of ISO A4 size is, for example, read by a CCD sensor along the main scanning direction. One main scanning line is divided into 1728 pixels, and each of the pixels is converted into a digital signal in accordance with its luminance. Main scanning is repeated in the subscanning direction intersecting the main scanning direction. The original 10 will have been entirely converted into digital signals when the scanning in the subscanning direction is completed.

The image converted into a digital signal is compressed in accordance with a system such as the above-stated MH, MR, MMR. The compressed signal is output to a communication line through a modem and transmitted to a facsimile machine on the other party.

Processing opposite to that conducted on the transmission side is conducted on the reception side. More specifically, the facsimile machine on the reception side converts an analog signal which it receives into a digital signal. The converted digital signal is converted into the digital signal by expansion processing opposite to the compression. The original image is reproduced by printing the obtained digital signal in the same procedure as that when the image is read.

Compression/expansion of an original is performed for the purpose of increasing the efficiency of use of a communication line and reducing time required for communication by reducing the amount of data transmitted.

FIGS. 3 and 4 each represent a coding system of MH as an example. MH coding is of one-dimensional run length coding system. In this system, one line data is composed of a series of variable-length codes. Each code represents a white or black run length. The white run length is abbreviated as white run, and the black run length as black run. The white run and the black run are produced alternately. The lines each begin with a code of white run in order to ensure synchronism between a receiver and a signal. If a scanning line begins with the black run, a code representing the white run of length 0 is initially transmitted. The MH coding includes two kinds of codes: a terminating code and a make-up code.

FIG. 3 sets forth terminating codes. The terminating codes indicate run lengths in the range from 0 to 63 pixels. In order to increase compression efficiency, a short code is allotted for a run length often appearing in image information.

FIG. 4 sets forth make-up codes. The make-up codes are for representing run lengths in the range from 64 to 1728 pixels in combination with the terminating codes. A run length in the range between 64 and 1728 pixels is initially coded by a make-up code representing a run length equal to or shorter than that run length. Thereafter, a terminating code representing the difference between an actual run length and the run length represented by the make-up code follows.

The receiver can expand data by checking received data with a table for demodulation prepared in advance.

As stated above, transmission of an image by a facsimile machine can be conducted efficiently and in a reduced time period by compressing transmission data by means of coding.

Such a facsimile machine however bears the following problem. As shown in FIG. 1, compression by coding can be conducted efficiently when the original 10 is correctly supplied to the machine and the main scanning direction coincides with the direction in which character strings 12 extend.

However, as shown in FIG. 2, when the original 10 is deviated and supplied to the machine, and the main scanning direction does not coincide with the direction of the character strings 12, the compression efficiency degrades. This is for the following reason. The direction in which characters are arranged in character strings relative to the main scanning direction is hereinafter called "skew".

As described above, according to the coding system, a short code is allotted to a run length often appearing in image information and a relatively long code to a run length appearing not so frequently. Therefore, as shown in FIG. 2, when the direction of a main scanning line 14 read by the first main scanning does not coincide with the direction of the character strings 12, the frequency of a run length appearing becomes irregular, thereby degrading the efficiency of data compression.

Furthermore, as shown in FIG. 1, suppose that the character strings are placed at intervals of spacings d0. When the original 10 is supplied to the facsimile machine in the correct direction, a main scanning line existing in the spacing d0 includes white runs only. The image in this part can therefore be coded at a very high efficiency using the above-stated make-up codes. On the other hand, as shown in FIG. 2, when the original 10 is deviated and supplied to the facsimile machine, a main scanning line composed of white runs only is limited to a spacing d1. As can be seen from the figure, the spacing d1 is much smaller than the spacing d0. As compared to the case shown in FIG. 1, the compression efficiency in the case shown in FIG. 2 is therefore considerably degraded.

In order to solve such a problem, facsimile machines or the like capable of detecting such a deviation, coding and correcting the deviation are proposed, for example, in Japanese Patent Laying-Open No. 55-154871, Japanese Patent Laying-Open No. 62-206962, and Japanese Patent Laying-Open No. 63-88963.

Japanese Patent Laying-Open No. 55-154871 suggests a method of image reading using a specially marked sheet of paper for an original in a facsimile machine. The deviation of the original can be found by detecting this mark when the original is read. Coordinate transformation is made to the read data for canceling this deviation. This increases the efficiency of coding.

Japanese Patent Laying-Open No. 62-206962 proposes use of a sensor provided at the image reading portion of a facsimile machine and for detecting time when the leading edge of an original supplied passes the sensor. The spacial relation between two points at the leading edge of an original supplied at a prescribed speed can be found by detecting the time difference between the two points in passing the prescribed sensor. The size of the original supplied can also be found at that time. The deviation of the original can be detected from these kinds of information. Coordinate transformation is conducted to the obtained data so as to cancel the obtained deviation, thereby increasing the compression efficiency of the data.

Japanese Patent Laying-Open No. 63-88963 discloses a method of detecting the time when one end of an original in the subscanning direction is scanned based on a change of a signal level in reading the original in a facsimile machine. At the time of main scanning, writing of data of a main scanning line into an image memory is initiated using the time of detecting the end of a sheet as a reference. Using this method, one end of the original is stored into the image memory always in parallel with the end of the image memory. The deviation of the original is removed from the image, thereby increasing the compression efficiency.

The above-stated prior art technology still have the following problem yet to be solved. Consider a language such as Japanese whose characters can be written either vertically or horizontally. In the case of such a language, as shown in FIG. 5, a sheet of ISO A4 size with vertically written characters may be supplied to an image reader along the lengthwise direction of the sheet. In such a case, the compression efficiency can not be increased even when the deviation of the original itself is detected and corrected.

Also, even in the case of a document with horizontally written characters, a similar problem arises when the document is supplied to the image reader in the direction in coincidence with the direction in which the character strings extend.

SUMMARY OF THE INVENTION

It is therefore an object of the present invention to provide an image reader and a facsimile machine permitting higher efficiency in data compression by coding, regardless of the direction in which an original is inserted to the same.

Another object of the present invention is to provide an image reader and a facsimile machine permitting more efficient data compression by coding even when an original is inserted whose character strings are in the direction perpendicular to the main scanning direction.

Yet another object of the present invention is to provide an image reader and a facsimile machine capable of eliminating the skew of an image produced due to the direction of an inserted original.

image reader in accordance with the present invention includes a scanner for reading a two-dimensional image and converting the read image into two-dimensional image data, a memory for storing the two-dimensional image data, a correction circuit for correcting the two-dimensional image data so that the direction of character strings included in the two-dimensional image represented by the two-dimensional image data stored in the memory coincides with a predetermined first direction, and a coding circuit for reading the corrected (rotated) two-dimensional image data from the memory in the order along the first direction and coding the read data.

The two-dimensional image data read by the scanner is stored in the memory. The two-dimensional image data is corrected so that the direction of its character strings coincides with the predetermined first direction. The corrected image data is read out from the memory along the first direction and coded.

With the direction of the character strings coinciding with the direction of reading from the memory, the character strings will not overlap the empty parts between the character strings in the image and will not degrade the compression efficiency of the image.

According to another aspect of the present invention, a facsimile machine includes an image reader for reading two-dimensional image data and converting the read data into coded image data, and a transmitter for transmitting the coded image data output from the image reader to another facsimile machine through a communication path. The image reader includes a scanner for reading a two-dimensional image and converting the read image into two-dimensional image data, a memory for storing the two-dimensional image data, a correction circuit for correcting the two-dimensional image data so that the direction of character strings included in the two-dimensional image represented by the two-image data stored in the memory coincides with a predetermined first direction, and a coding circuit for reading the corrected (rotated) two-dimensional image data in the order along the predetermined first direction and coding the read data.

The two-dimensional image data read by the scanner is once stored in the memory. The stored two-dimensional image data is corrected so that the direction of character strings included therein coincides with the direction of the order in which the data is read from the memory. The corrected two-dimensional image data is read out from the memory in a prescribed order and coded. The coded image data is transmitted to another facsimile machine by a transmission circuit.

With the direction of the character strings included in the two-dimensional image coinciding with the direction of the order in which the data is read out from the memory, the character strings will not overlap the empty spaces between the character strings included in the image. Compression of the empty spaces can therefore be efficiently conducted, and compression of the part of the character strings can be conducted more efficiently than otherwise. The facsimile machine can thus transmit originals at high speed, using a code compressed at a high efficiency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a representation partially showing terminating codes included in MH coding system;

FIG. 4 is a representation partially showing make-up codes included in MH coding system;

FIGS. 13(A) and 13(B) are views for illustrating the relation between the row of character arrangement and the scanning direction in the operation of the image reader shown in FIG. 8;

DESCRIPTION OF THE PREFERRED EMBODIMENTS

Figure 1:
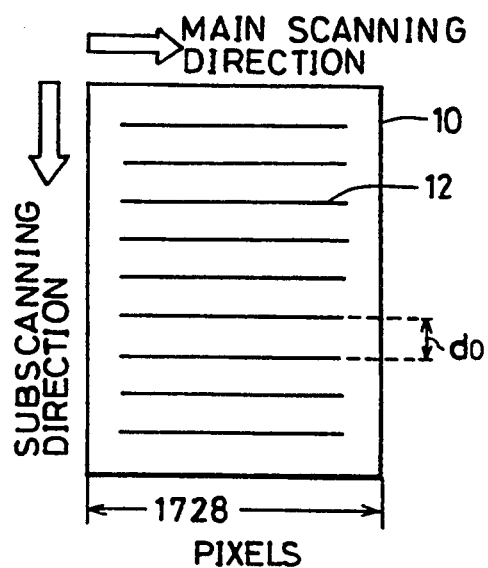
FIG. 1 is a view schematically showing an original.
Figure 2:
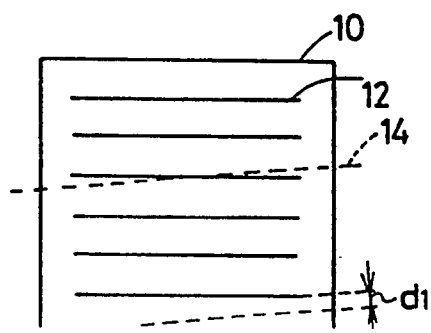
FIG. 2 is a view schematically showing an original.
Figure 5:
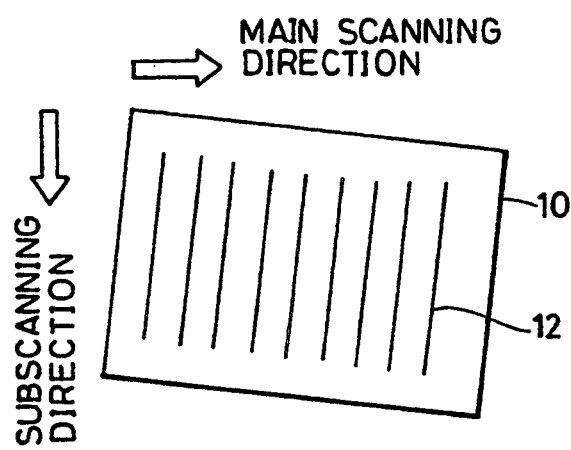
FIG. 5 is a view schematically showing an original.
Figure 6:
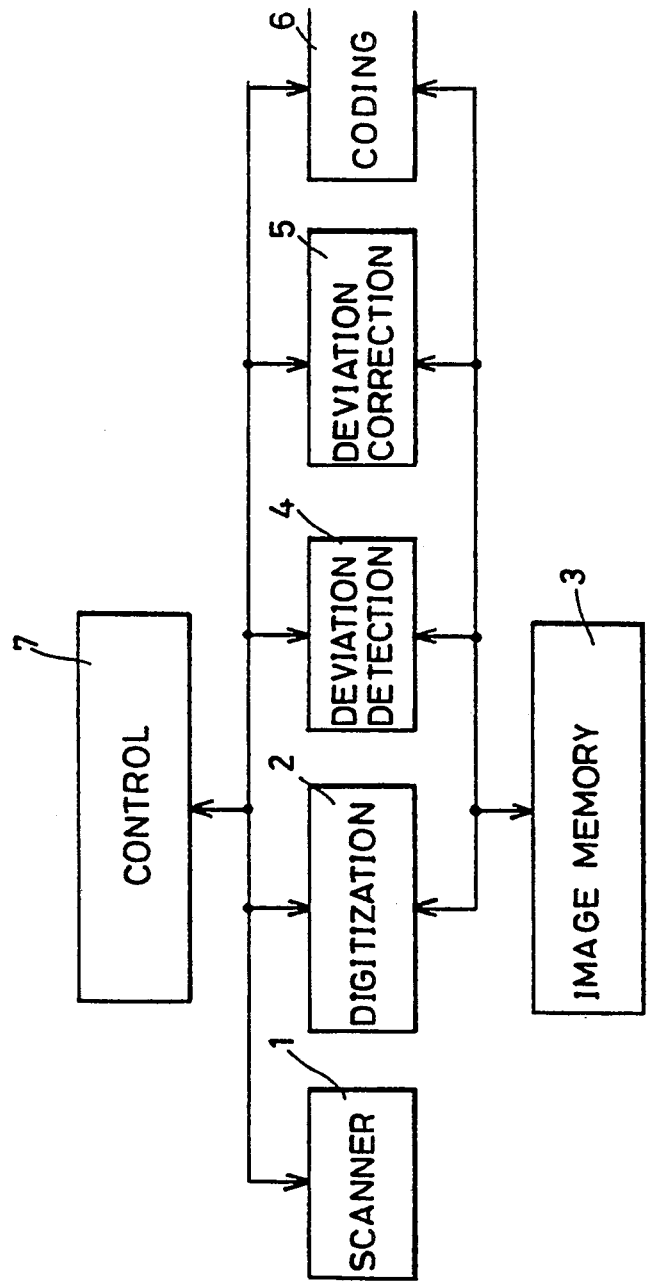
FIG. 6 is a block diagram schematically showing a structure of an image reader in accordance with one embodiment of the present invention.

Referring to FIG. 6, a scanner 1 is a device for reading an image to be read such as a printed image by sequentially scanning the image in a fixed direction, and a digitizer 2 is a circuit portion for conducting digitizing processing to the image data read by scanner 1. The digitized image data is once stored in an image memory A deviation detection unit 4 is a circuit for detecting the part corresponding to character strings in the image from the image data for one image stored in image memory 3 and further detecting the deviation of the character strings.

A deviation correction unit 5 is a circuit for correcting (rotating) the arrangement of the digitized image data in image memory 3 by the skew detected by the deviation detection unit 4 to be the same as the arrangement of the image data in which reading is conducted with the arrangement direction of the character strings coinciding with the scanning direction. The corrected image data is once stored in image memory 3.

A coding unit 6 is a circuit for conducting coding processing to the corrected image data, using the above-stated MH, MR, MMR, etc. The coded image data is either once stored in image memory 3 or is transmitted to another facsimile machine through a transmission mechanism (not shown).

A control unit 7 is a circuit for conducting total control of the image reader including the above-stated scanner 1, digitizer 2, image memory 3, deviation detection unit 4, deviation correction unit 5, coding unit 6, etc.

Figure 7:
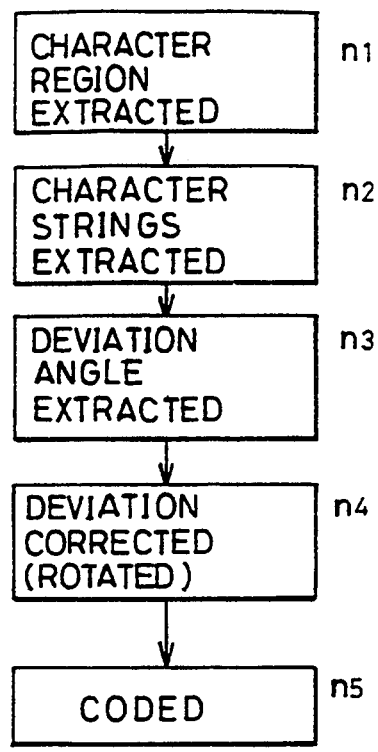
FIG. 7 is a flow chart showing the operation of the image reader shown in FIG. 6.
Figure 8:
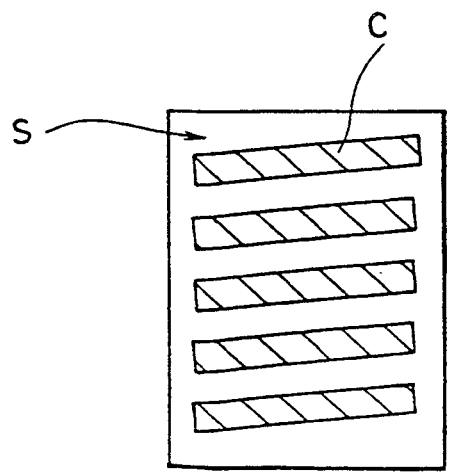
FIG. 8 is a view showing the character strings of an image being read deviated to the scanning direction.

Referring to FIG. 7, the image reader operates as follows in reading an image including character strings. Scanner 1 obtains image data of one sheet of image by sequentially scanning the same in a predetermined direction. Digitizer 2 digitizes the read image data. Image memory 3 stores the digitized image data.

Deviation detection unit 4 extracts from the image data the data part corresponding to the region in which characters are arranged for one image stored in the image memory (step n1), extracts therefrom the data portion corresponding to character strings (step n2), and detects the deviation angle of the character strings relative to the main scanning direction of scanner 1, in other words the skew of the character strings from the data portion of the character strings (step n3).

Deviation correction unit 5 rotates and corrects the arrangement of the stored image data for the one image in image memory 3 by the skew detected by deviation detection unit 4 (step n4). The arrangement of the stored image data in image memory 3 is thus re-stored in the same arrangement as the image data which will be obtained if reading is conducted so that the direction of the character strings coincide with the scanning direction. Coding unit 6 conducts coding processing such as MH, MR, MMR, etc. to the corrected image data (step n5).

The coded image data is transmitted to, for example, another facsimile machine through a transmission mechanism (not shown), or is once stored in image memory. Thus correcting the deviation increases the compression efficiency at the time of coding.

Figure 9:
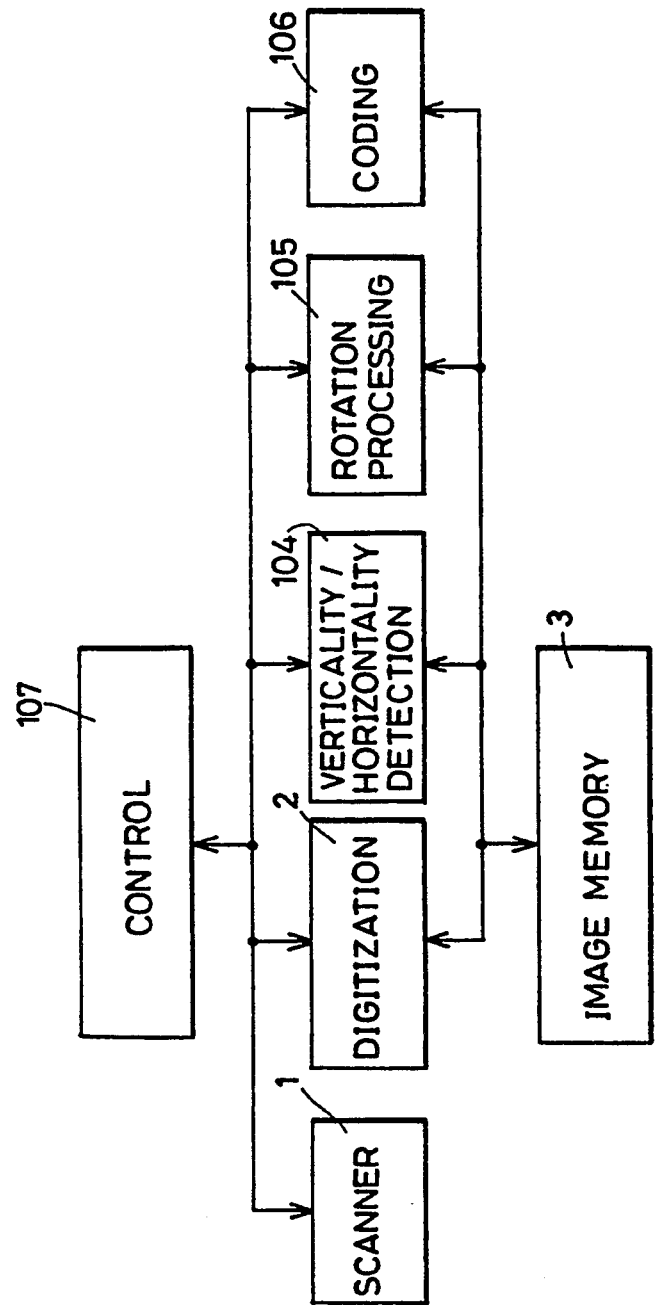
FIG. 9 is a block diagram schematically showing a structure of an image reader in accordance with another embodiment of the present invention.
Figure 10:
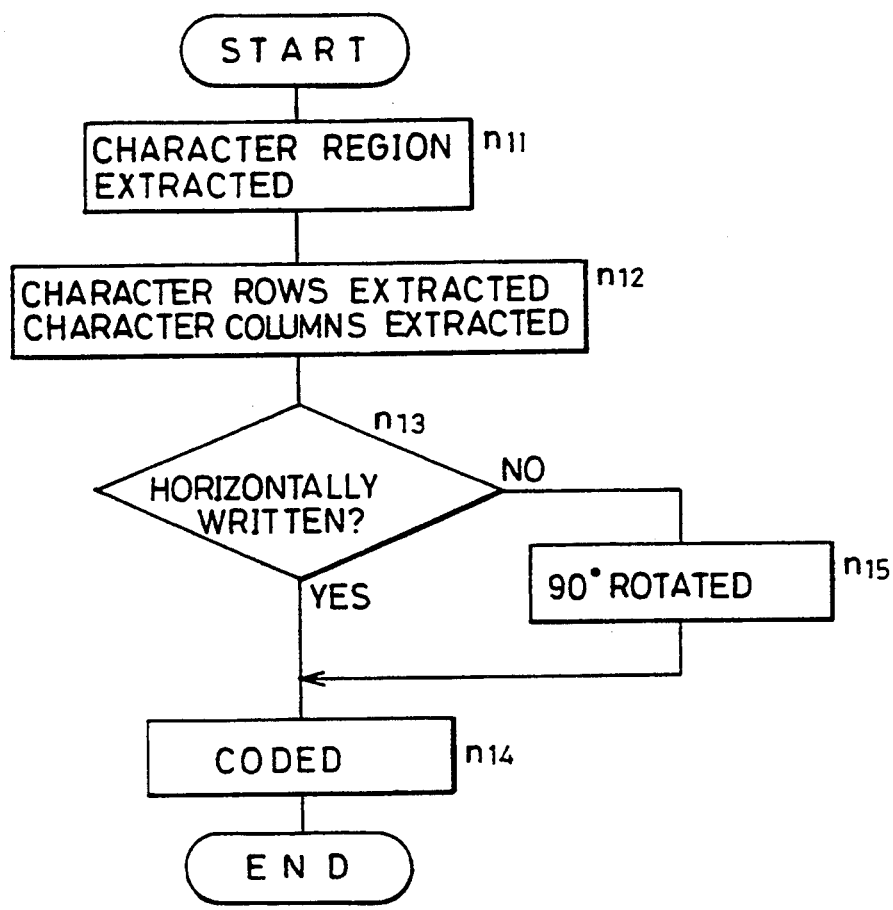
FIG. 10 is a flow chart showing the operation of the image reader shown in FIG. 9.

FIG. 9 is a block diagram schematically showing a structure of an image reader in accordance with another embodiment of the present invention. Scanner 1, digitizer 2 and image memory 3 shown in FIG. 9 are identical to those shown in FIG. 6. Detailed description will therefore be not provided on these components.

A verticality/horizontality detection unit 104 is a circuit for detecting the part corresponding to the region of characters in an image from image data for one image stored in image memory 3, and further determining whether the arrangement direction of the characters in the character region is horizontally arranged (the arrangement direction in coincidence with the main scanning direction) or vertically arranged (the arrangement direction intersecting the main scanning direction).

A rotation processing unit 105 is a circuit for rotating and correcting the arrangement of the digitized image data in image memory by 90° when verticality/horizontality detection unit 104 detects the vertical arrangement direction, so that the arrangement direction of the characters is the same as the arrangement of the image data which will be obtained if reading is conducted such that the arrangement direction of the characters is set horizontally. The corrected image data is stored in image memory.

A coding unit 106 is a circuit for conducting coding processing to the image data rotated and corrected at rotation processing unit 105 when verticality/horizontality detection unit 104 detects the vertical arrangement direction, while conducts coding the image data digitized only (not rotated and corrected) when verticality/horizontality detection unit 104 detects the horizontal arrangement direction. The coded image data is either stored in image memory or is transmitted to another facsimile machine through a transmission mechanism (not shown). A control unit 107 is a circuit for conducting total control of the image reader including the above-stated scanner 1, digitizer 2, image memory 3, verticality/horizontality detection unit 104, rotation processing unit 105 and coding unit 106.

The image reader operates as follows in reading as an image a document with horizontally written characters and a document with vertically written characters. Hereinafter, rows or columns of characters whether horizontally written or vertically written will be referred to as "character strings".

For the purpose of simplification, assume that a document with horizontally written characters is read in the direction of its character strings coinciding with the scanning direction, while a document with vertical written characters is read in the direction of its character strings intersecting the scanning direction.

Scanner 1 obtains image data of a document by sequentially scanning the document with horizontally written characters or vertically written characters to be read in a predetermined direction. Digitizer 2 digitizes the read image data. Image memory 3 stores the digitized image data.

Verticality/horizontality detection unit 104 extracts the data portion corresponding to the region of characters from the image data for the image stored in image memory (step n11), extracts therefrom the data portion corresponding to the character strings, and further determines from the data portion of the character strings whether the arrangement direction of the character strings coincides with or intersects the direction of scanning the image by scanner 1, in other words it determines whether it the characters are horizontally arranged or vertically arranged (step n13).

When verticality/horizontality detection unit 104 detects the horizontally written document, in other words the arrangement direction of the characters is determined to be the horizontal arrangement direction in coincidence with the main scanning direction, coding unit 106 encodes image data which is read and not corrected yet (step n14).

When verticality/horizontality detection unit 104 detects the vertically written document, in other words the arrangement direction of the characters is determined to be the direction intersecting the main scanning direction, rotation processing unit 105 rotates and corrects the arrangement of the stored image data in image memory 3 by 90° (step n15). The arrangement of the stored image data in image memory 3 is thus re-stored in an arrangement identical to the state of the image data read with the horizontal arrangement direction i.e. the direction of character arrangement being in coincidence with the scanning direction.

Coding unit 106 conducts coding processing such as MH, MR, MMR, etc. to the rotated and corrected image data (step n14).

The coded image data is either transmitted to another facsimile machine through a transmission mechanism (not shown), or is stored in image memory 3.

Thus, when the document is read with the arrangement direction of its characters being in the vertical arrangement direction intersecting the man scanning direction, the compression efficiency of the data in coding the read image data will be significantly increased.

Application of the above-stated image reader to a facsimile machine may include transmission of subdata for identifying whether the coded image data is horizontally written or vertically written along with the coded image data. A facsimile machine for receiving the image data may reproduce the image by conducting 90° reverse rotation correction if necessary, by referring to the subdata in the process of decoding the image data.

Also in the case of an image filing device in which its image reader does not transmit image data, verticality/horizontality detection unit 104 may store the result of determination along with the coded image data. Upon decoding of the image data, if it is identified to be image data on a vertically written document, the image may be reproduced by conducting 90° reverse rotation correction.

Figure 11:
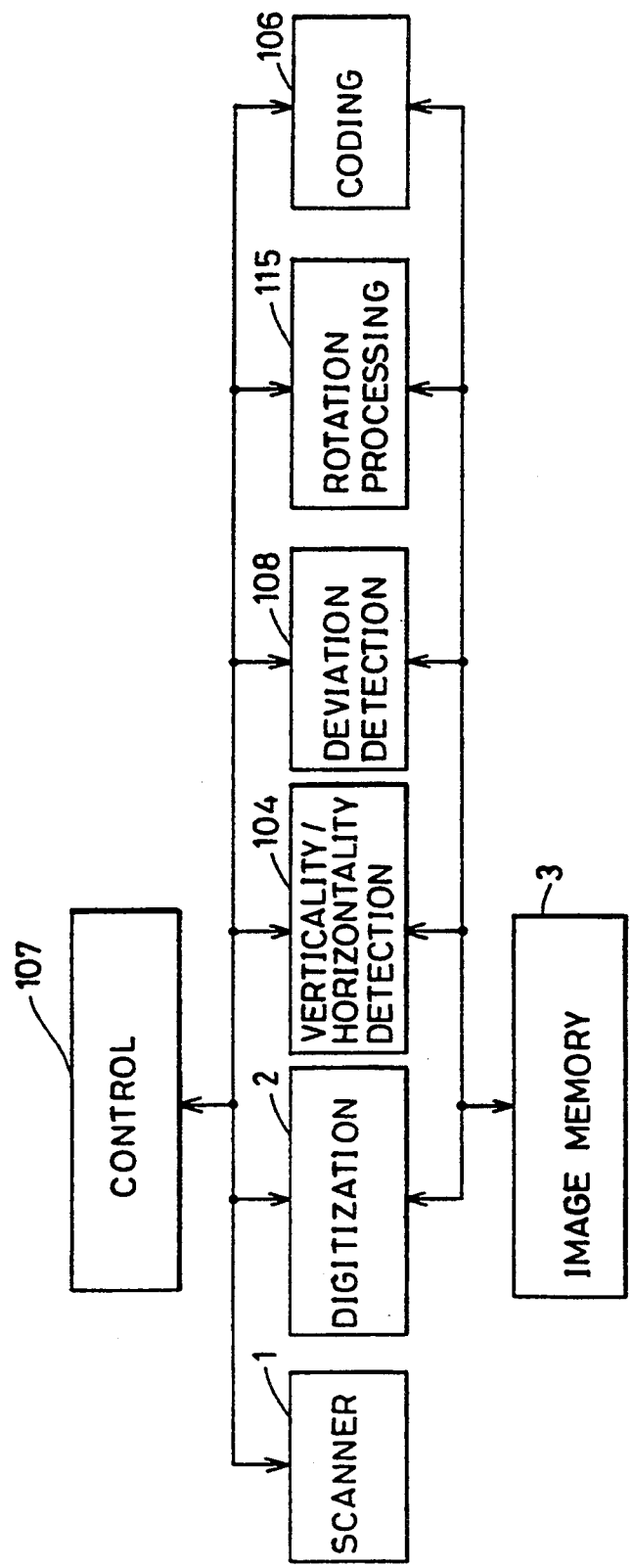
FIG. 11 is a block diagram schematically showing a structure of an image reader in accordance with another embodiment of the present invention.

FIG. 11 is a block diagram schematically showing a structure of an image reader in accordance with another embodiment of the present invention.

The image reader of the present embodiment is different from the foregoing embodiments in that the image reader not only determines whether the arrangement direction of characters is horizontal or vertical but also how large the deviation angle made by the arrangement direction and the scanning direction is, regardless of the horizontal or vertical arrangement direction, and correction of the deviation angle is made prior to coding of the read image data. A deviation angle detection unit 108 in FIG. 11 is a circuit for detecting from the read image data, the deviation angle of the arrangement direction of its characters relative to the main scanning direction.

A rotation processing unit 115, unlike rotation processing unit 105 of the foregoing embodiment (FIG. 9), can rotate and correct the arrangement of the image data for the read image by the above-stated deviation angle not only when the characters are vertically arranged but also horizontally arranged.

The other circuits, in other words scanner 1, digitizer 2, image memory 3, verticality/horizontality detection unit 104, coding unit 106, and control unit 107 are substantially the same as those of the foregoing embodiment shown in FIG. 4. Detailed description will therefore be not provided on these components.

Figure 12:
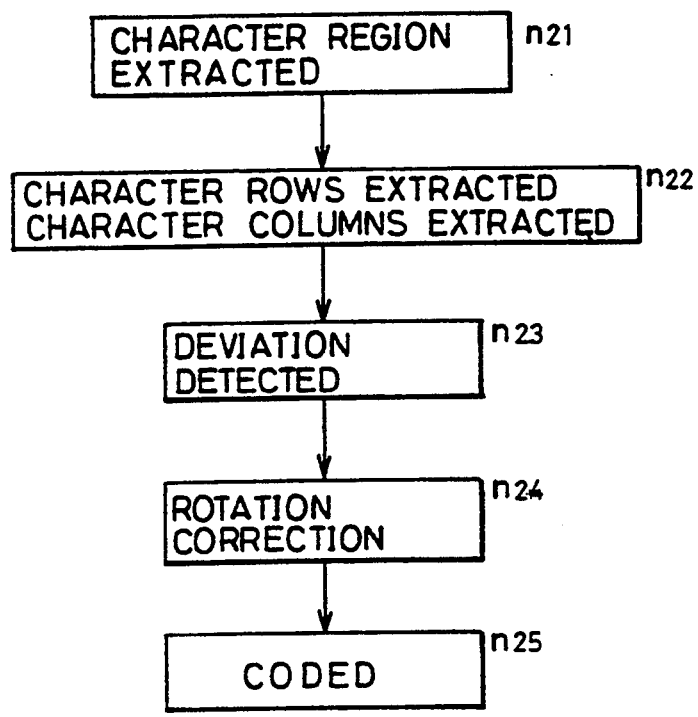
FIG. 12 is a flow chart showing the operation of the image reader shown in FIG. 11.

Referring to FIGS. 12 and 13, the image reader in accordance with the present invention operates as follows in its reading operation. Scanner 1 reads image data of a document with horizontally written characters or vertically written characters to be read by sequentially scanning the document. Digitizer 2 digitizes the read image data. Image memory 3 stores the digitized image data.

Verticality/horizontality detection unit 104 extracts the data portion corresponding to the region of characters from the image data stored in image memory (step n21). Verticality/horizontality detection unit 104 extracts therefrom the data portion corresponding to the character strings, and detects from the data portion of the character strings whether the arrangement direction of the characters coincides with or intersects the direction of scanning images by scanner 1, in other words, whether it is a horizontal written document or a vertically written document (step n22).

Whether the result of the detection by verticality/horizontality detection unit 104 indicates a document with horizontally written characters or a document with vertically written characters, deviation detection unit 108 detects the deviation angle of the arrangement direction relative to the main scanning direction (step n23).

When the document to be read is a horizontally written document A1 including a character string r as shown in FIG. 13(1), and the direction in which the character string r is arranged is slightly deviated (has angle $\alpha$) to a scanning direction S, in other words the arrangement direction of the characters is substantially horizontal, the angle $\alpha$ detected at deviation angle detection unit 108 is in the range between $-45°$ and $45°$. When the document to be read is a vertically written document A2 including a character string c as shown in FIG. 13(2), and the arrangement direction of its character string c has a slight deviation (angle $\beta$) relative to the direction intersecting the main scanning direction S, in other words the arrangement direction of the characters is vertical rather than horizontal, the detected angle $\beta$ is in the range between $45°$ and $135°$.

Rotation processing unit 115 rotates and corrects the arrangement of the stored image data in image memory 3 by the detected angle $\alpha$ or $\beta$ (step n24). The arrangement of the stored image data in image memory 3 is thus re-stored in the same arrangement state as when the image data is read with the arrangement direction of the characters coinciding with the scanning direction.

Coding unit 106 encodes the corrected image data. The encoded image data is either transmitted to another facsimile machine through a transmission mechanism (not shown) or is stored in image memory 3.

The image data of a document with characters arranged in the vertical direction is rotated and corrected so as have the same arrangement as a document with horizontally arranged characters, and further, in both cases, the arrangement of stored image data is rotated and corrected by the deviation angle relative to the main scanning direction and is thereafter the image data is coded. Therefore, the data compression efficiency will not be degraded due to the overlap in which a scanning line crosses two or more character strings.

In this embodiment, as similar to the device shown in FIG. 9, subdata for identifying whether the coded image data is horizontally written or vertically written may be added to the image data. The image data can be subjected to 90° reverse rotation correction if necessary at the time of reproduction.

Figure 14:
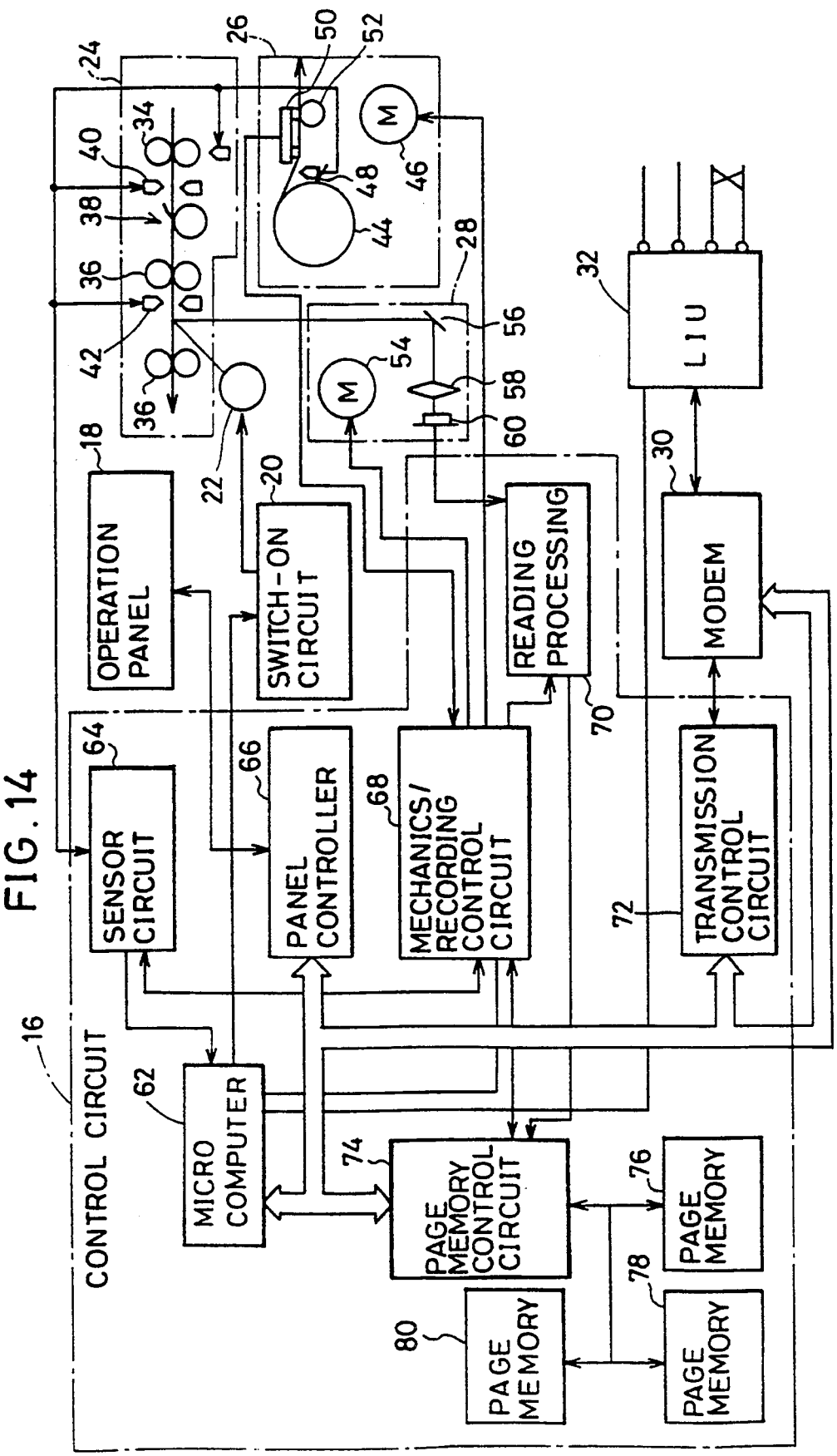
FIG. 14 is a block diagram showing a facsimile machine in accordance with another embodiment of the present invention.

FIG. 14 is a circuit block diagram showing a facsimile machine in accordance with yet another embodiment of the present invention. Referring to FIG. 14, the facsimile machine includes a control circuit 16 for conducting total control of the machine, an operation panel 18 connected to control circuit 16, an original feed mechanism 24 connected to control circuit 16 for feeding an original to be transmitted for reading, a fluorescent light 22 for brightening the original fed by original feed mechanism 24 for reading, a switch-on circuit 20 controlled by control circuit 16 for controlling switch-on of fluorescent light 22, a reading mechanism 28 for receiving light emitted by fluorescent light 22 and reflected by the original and reading the original by means of photoelectric conversion, a printing mechanism 26 connected to control circuit 16 for printing out the received original onto a sheet of recording paper 44, an LIU (Line Interface Unit) 32 for interfacing the facsimile machine with a telephone line, and a modem 30 for converting an analog signal transmitted through the line and a digital signal used in control circuit 16 into each other.

Control circuit 16 includes a sensor circuit 64 for controlling sensors provided at the respective positions and processing signals from the sensors, a panel controller 66 for monitoring key inputs through key-scanning operation panel 16 and controlling switch-on of an LED (Light Emitting Diode) on operation panel 18, a mechanics/recording control circuit 68 for controlling a motor for feeding the original or sheet of recording paper 44 and for controlling the printing head and printing pressure of printing mechanism 26, a reading processing circuit 70 for controlling an analog pixel signal obtained by reading mechanism 28 to be at a predetermined level by AGC (Auto Gain Control) processing and correcting optical distortion caused by an optics included in reading mechanism 28 or signal distortion due to the variations in the sensitivity of a CCD image sensor, and a transmission control circuit 72 for controlling transmission processing of data by modem 30.

The facsimile machine further includes a microcomputer 62 connected to sensor circuit 64, panel controller 66, mechanics/recording control circuit 68, transmission control circuit 72 and modem 30 for conducting controls such as a transmission control procedure in each mode conducted in each circuit, coding/decoding processing, operation in self-diagnosis mode, a page memory 76 for storing a digital signal on the read image output from reading processing circuit 70, page memories 78 and 80 for storing digital image signals undergoing correction by microcomputer 62 which is a characteristic of the present invention, and a page memory control circuit 74 connected to microcomputer 62, mechanics/record control circuit 68, reading processing circuit 70, and page memories 76, 78 and 80, and controlled by microcomputer 62 for controlling writing of an image signal into page memories 76, 78 and 80, and reading and coding/decoding processing of an image signal therefrom.

Original feed mechanism 24 includes supply rollers 34 for supplying originals to be read one by one, a rubber plate 38 for separating the originals, feed rollers 36 driven by a pulse motor (not shown) for feeding the originals, an original sensor 40 disposed between supply rollers 34 and rubber plate 38 facing the opposing planes of the original to be fed for detecting setting of the original and applying a signal representing the detection to sensor circuit 64, and an original end sensor 42 provided between feed roller 36 and immediately before the position at which the original is lighted by fluorescent light 22, for detecting the both ends of the leading edge of the supplied original and applying a signal representing the detection to sensor circuit 64.

Printing mechanism 26 includes a thermal head 50 connected to a paper-empty sensor 48 for detecting the run out of sheets of recording paper 44 and mechanics/-recording control circuit 68, for forming an image on a sheet of recording paper 44 by scanning the sheet of recording paper 44 in accordance with a signal applied from mechanics/recording control circuit 68, a roller for holding the recording paper 44 between thermal head 50 and itself, and a pulse motor 46 for driving roller 52 to rotate to take out the sheet of recording paper 44.

Reading mechanism 28 includes a mirror 56 for guiding light emitted from fluorescent light 22 and reflected upon the surface of an original into a prescribed optical path, a lens 58 provided on the optical path of the light reflected from mirror 56 for forming the image of the original by collecting rays from the original, a CCD 60 of 2048 bits for converting the image of the original formed by lens 58 into an electric signal to be applied to reading processing circuit 70, and a motor 54 for moving lens 58 and CCD 60 to a prescribed position in accordance with the magnification.

Figure 15:
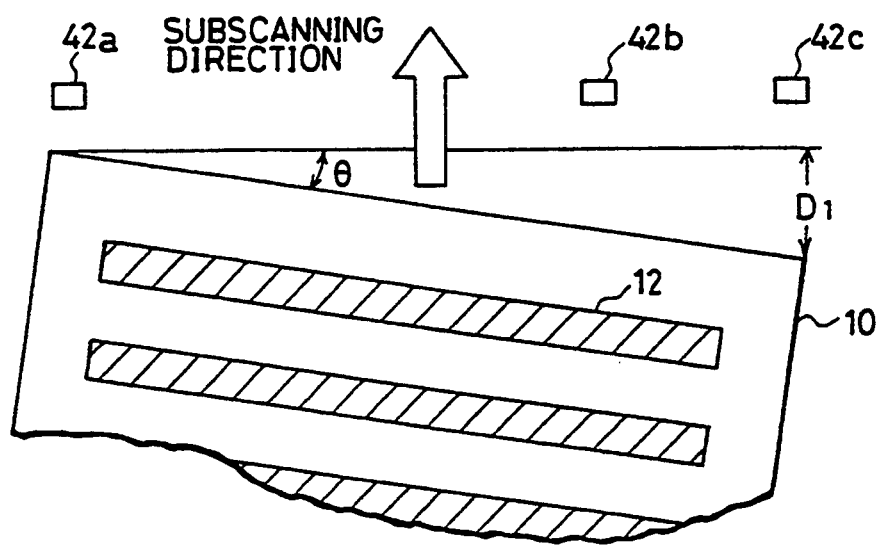
FIG. 15 is a view schematically showing the placement of a sensor for detecting the leading edge of an original supplied to a facsimile machine.

Referring to FIG. 15, original end sensor 42 shown in FIG. 14 includes a sensor 42a for detecting the left end of the leading edge of an original 10 supplied to sensor 42, a sensor 42b provided a distance the same as the breadth of a sheet of ISO B5 size away from sensor 42a for detecting the right end of the leading edge of a sheet of B5 size, and a sensor 42c provided a distance identical to the breadth of a sheet of ISO A4 size away from sensor 42a for detecting the right end of a sheet of A4 size.

A facsimile machine in accordance with the present invention is characterized in that not only the deviation of an original is corrected by a program executed in microcomputer 62 but also the direction of the character strings of the original is detected and the read image signal is converted using page memories 76–80 in order to increase the compression efficiency as much as possible.

Referring to FIGS. 14–20, the facsimile machine in accordance with the present invention operates as follows. A principle of the operation of the facsimile machine in reading an original, to which the present invention mainly relates will be described.

An operator places originals to be transmitted on an original plate (not shown) provided near supply rollers 34. Upon detecting the originals, sensor 40 applies a signal representing the detection to sensor circuit 64. The operator then presses a start button (not shown) provided on operation panel 18. Panel controller 66 which sequentially scans each key of operation panel 18 as stated above detects the pressing of the start button by the operator. Panel controller 66 applies a signal representing the detection to microcomputer 62.

Microcomputer 62 receives the signal representing the setting of transmission originals and the signal representing the pressing of the start button from sensor circuit 64 and panel controller 66, respectively and operates as follows. Microcomputer 62 controls page memory control circuit 74 to enable page memory 76–80 for writing of an image to page memories 76–80. Microcomputer 62 then controls mechanics/recording control circuit 68 and operates the pulse motor (not shown) for feeding the originals. Feed rollers 36 are rotated by the pulse motor and the originals are fed in the subscanning direction. At that time, a separated original is fed for reading by rubber plate 38.

The originals fed passes in front of sensor 42 before being read by CCD 60. Referring to FIG. 15, suppose that the leading edge of the original 10 is deviated by angle $\theta$ relative to the main scanning direction (which intersects the feeding direction of the original). The original 10 is of A4 size. The left end and right end of the leading edge of the original 10 is shifted by a distance D1 in the subscanning direction due to this deviation $\theta$.

The speed of feeding the original 10 is detected by circuit 68, and microcomputer 62 can calculate the speed. The breadth of the original 10 is known from the sensor output. Therefore, the deviation $\theta$ can readily be known by finding time interval between a signal from sensor 42a detecting the left end of the leading edge of the original 10 passing and a signal from sensor 42c detecting passing of the right end of the leading edge of the original 10.

If the sheet 10 is of B5 size, the deviation $\theta$ can be found based on signals from sensors 42a and 42b.

The signals from sensors 42a–42c are applied to sensor circuit 64. Sensor circuit 64 applies the output result of each sensors 42a–42c to microcomputer 62. Microcomputer 62 produces the deviation $\theta$ in accordance with a predetermined operation.

Microcomputer 62 controls switch-on circuit 20 and switches on fluorescent light 22. Light emitted from fluorescent light 22 is reflected upon the surface of the original and reaches mirror 56. The light reflected by the mirror 56 forms the image of the original by lens 58 on the light receiving surface of CCD 60. At that time, depending upon the size of the original, the positions of lens 58 and CCD 60 are moved by motor 54, thereby adjusting the magnification of the image. CCD 60 electrically scans the image of the original in the main scanning direction, outputs an analog signal in accordance with the luminance on the surface of the original, and applies the analog signal to reading processing circuit 70.

Reading processing circuit 70 renders the analog signal applied from CCD 60 to be at a predetermined level, corrects optical distortions included in the signal output from CCD and distortions due to variation in the sensitivity of CCD, and applies the corrected signal to page memory control circuit 74.

Page memory control circuit 74 starts writing the output from reading processing circuit 70 into page memory 76 the moment sensor 42a shown in FIG. 15 detects the passage of the left end of the leading edge of the original.

Figure 16:
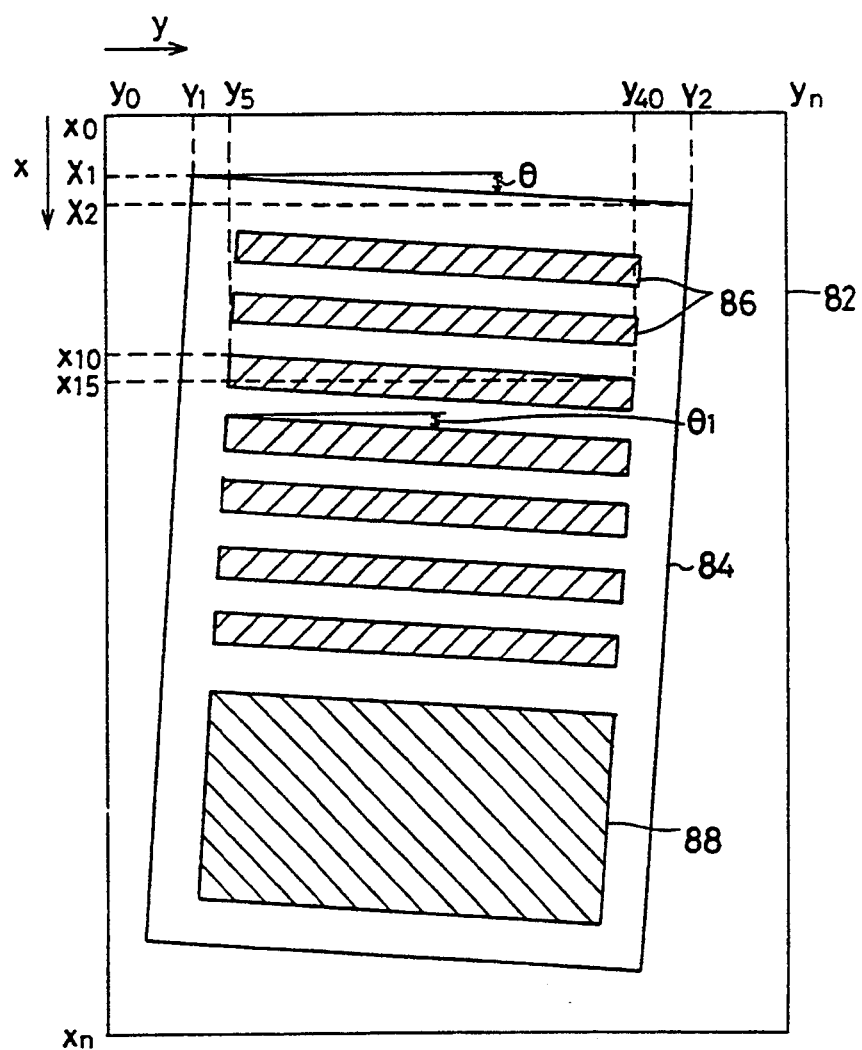
FIGS. 16–19 are views each schematically showing an original image stored in a page memory.

The writing to page memory 76 is conducted as follows. Referring to FIG. 16, page memory 76 has an image storage region 82 formed of memory cells arranged two-dimensionally in x-direction and y-direction. Page memory 76 stores a signal obtained by the first main scanning in sequentially in one row in the y-direction of the memory cell of a certain address in the x-direction. The address in the x-direction is incremented sequentially along with subscanning. Therefore, an original image 84 is formed as a collection of main scanning lines in the subscanning direction in image storage region 82.

Referring to FIGS. 14 and 15, constant time difference is generated due to the shift between the position of sensor 42 and the position of the original when the original is actually read by CCD 60 in the time period since sensor 42a detects the left end of the leading edge of the original 10 until CCD 60 detects the same portion. Therefore, as shown in FIG. 16, the leftmost end of the leading edge of the original image 84 is stored in an address X1 in the x-direction and an address Y1 in the y-direction in the image storage region 82 of page memory 76. Thereafter, the image of the original is stored in page memory 76 in a form as shown in FIG. 16.

Referring to FIG. 16, the image storage region 82 of page memory 76 has addresses $x_0-x_n$ in the x-direction and addresses $y_0-y_n$ in the y-direction. The left end of the leading edge of the original image 84 stored in page memory has an address $(X_1, Y_1)$, and the right end of the leading edge of the original image 84 has an address $(X_2, Y_2)$. The difference between the addresses $(X_1, Y_1)$ and $(X_2, Y_2)$ is due to the deviation $\theta$ of the original as stated above.

The deviation $\theta$ of the original can readily be found by outputs from sensor 42a and sensor 42c. Microcomputer 62 coordinate-transforms the original image 84, using the found deviation $\theta$, and writes the data after the transformation to page memory 78. The coordinate transformation is conducted as to rotate the original image 84 by the angle $\theta$ around a prescribed point in image storage region 82 such as an address $(x_0, Y_0)$, using the method disclosed in U.S. Pat. No. 4,829,452.

Figure 17:
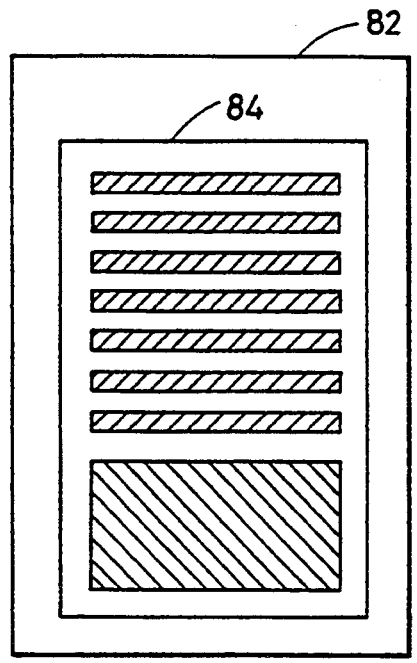

The data stored into page memory 78 as the result of the coordinate transformation, as shown in FIG. 17 has the four sides of the original in parallel with the corresponding sides of the image storage region 82. Consequently, when the original is supplied as shown in FIG. 16, the arrangement direction of the characters and the y-direction of the arrangement of memory cells in the page memory coincide.

Thus transforming the original image and reading the same in the y-direction of the addresses of page memory permits compression of the signal to be as effective as in the case when the original is inserted with no deviation. The compression efficiency of the image signal is therefore significantly increased as compared to the case in which the image signal as shown in FIG. 16 is compressed without correction.

As shown in FIG. 15, when the original 10 is deviated and supplied with the direction of character strings 12 on the original 10 being deviated from the main scanning direction of the image by a small angle $\theta$, an image signal after correction of the highest compression efficiency can be obtained immediately by means of the above-described coordinate transformation. However, the original is not always supplied in such a direction to the facsimile machine.

Figure 18:
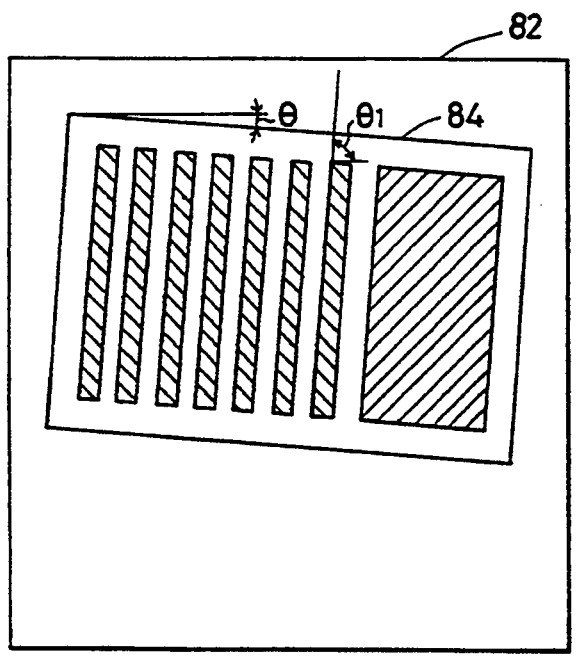

For example, referring to FIG. 18, as in the case of Japanese language, when an original with vertically written characters is supplied to the facsimile machine as it is, or when an original with horizontally written characters whether Japanese or English is rotated by approximately 90° and supplied to the facsimile machine, the above-stated correction is not enough for increasing the compression efficiency of the image signal. In other words, the corrections by the outputs from sensors 42a and 42c as shown in FIG. 15 only produces the image signal after the correction as shown in FIG. 19.

Figure 19:
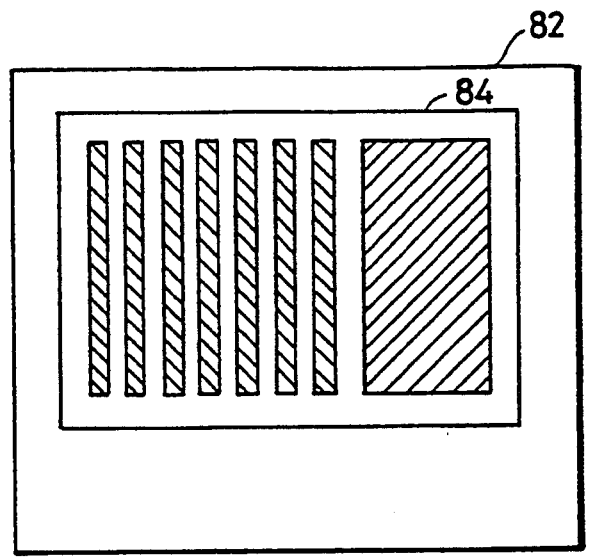

Referring to FIG. 19, as for the original in which characters are vertically arranged, the above-stated correction does not make the direction of character strings coincide with the direction of the image storage region 82. If the image is read out in the y-direction as it is and compressed, the compression efficiency is not increased.

A program executed by the microcomputer 62 of the facsimile machine in accordance with the present invention is characterized in that the direction of the character strings in the original is detected prior to coordinate transformation of the image by the deviation $\theta$ of the original obtained from sensors 42a and 42c as described above. The direction of the character strings is detected in accordance with the following procedure.

Microcomputer 62 examines the original image stored in page memory 76 and calculates the ratio of white points and black points in each part of the original image. It is known that there exists a characteristic difference between the ratio of the white points and black points in the region in which only character strings are arranged (hereinafter referred to as "character arrangement region") and that in the region in which images other than characters are formed. It is possible to distinguish the character arrangement region in which a row image 86 including characters only from an image region 88 in which images other than characters are formed by examining the distribution of the white points and black points in the original image 84.

The compression efficiency of the image would not significantly change in the image region 88 if the image is read from any direction. In contrast, as described above, it is known that the compression efficiency of the signal is significantly increased by reading and coding the original along the direction in which the row image 86 extends, in coding the region in which only the row image 86 is formed. Therefore, the compression efficiency of the signal will increase by detecting the character arrangement region as stated above, then detecting the direction of the row image 86 included in the character arrangement region and coding the image signal by reading the same in that detected direction.

Once the character arrangement region is specified, it is easy to find the direction in which the row image 86 extends as shown in FIG. 16. For example, Japanese Patent Laying-Open No. 2-215269 discloses a scanner device characterized by determining an effective image width in the main scanning direction, based on the continuity of black bits in the main scanning direction and the number of black bits in the subscanning direction. The approximate direction in which the row image 86 of the original image 84 extends can be found using the technique disclosed in this document. The angle made by the arrangement direction of the character strings and the y-axis is angle $\theta_1$.

Figure 20:
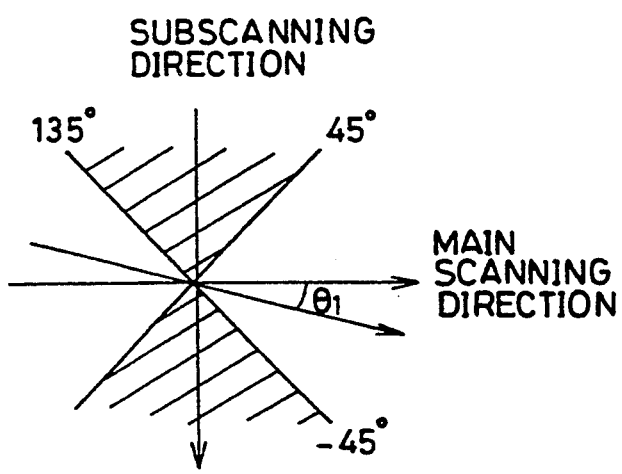
FIG. 20 is a representation schematically showing the angle made by the direction of character strings of an original and the main scanning direction.

Referring to FIG. 20, with the angle $\theta_1$ being in the range between −45° and 45°, the original is determined to be supplied to the facsimile machine in a state as shown in FIG. 16. In this case, as for correction of the image, it is sufficient to correct the angle $\theta$ detected by sensors 42a and 42c.

On the other hand, with the angle $\theta_1$ in the range between 45° and 135°, the original is determined to be supplied to the facsimile machine in a state as shown in FIG. 18. In this case, the original image 84 is rotated by 90° around a prescribed point in the image storage region 82, prior to correction of the angle $\theta$ by sensors 42a and 42c as stated above. The rotated image signal is stored in page memory 80. The original image after the 90° rotation is the same as shown in FIG. 16.

Microcomputer 62 corrects the original image 84 converted into a form as shown in FIG. 16 in order to cancel the angle $\theta$ detected by sensors 42a and 42c. The resultant image is as shown in FIG. 17. The image signal can be compressed at a high efficiency by sequentially reading the original image and coding the read image.

As in the foregoing, page memory 76 for initially storing the read image signal, page memory 80 for storing the 90° rotated image signal when the angle $\theta_1$ between the direction of the character strings and the main scanning direction is in the range between 45° and 135°, and page memory 78 for eventually storing the corrected image signal are provided. However, the present invention is not limited thereto, and the above-stated correction processing may be conducted by dividing one page memory into several regions. Also, the same page memory may be shared for different purposes.

FIGS. 21 to 28 are flow charts each schematically showing a program executed by microcomputer 62 in the facsimile machine in accordance with the above-described embodiment. The following flow charts each represent a program having a structure in which the processing is divided into a plurality of subroutines, and the processing is conducted by calling subroutines from the main routine. However, the configuration of the program is by no means limited thereto, and similar effects can be provided using, for example, a program in which all subroutines are incorporated in a main routine.

Figure 21:
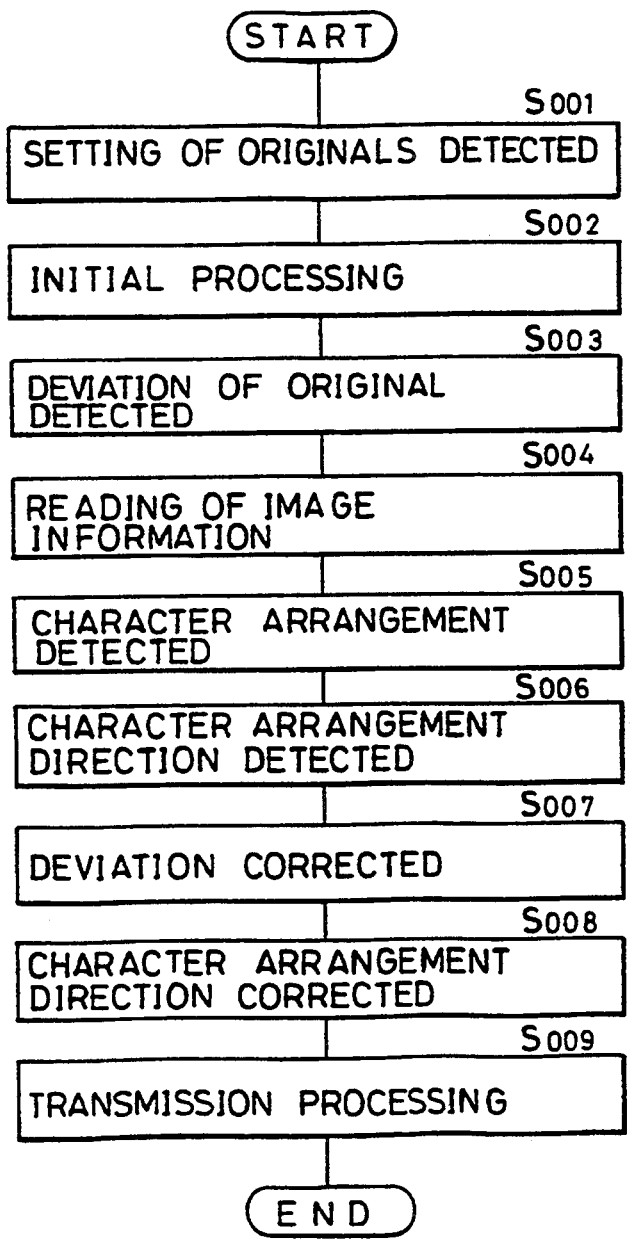
FIG. 21 is a flow chart showing the main routine of a program executed by a microcomputer in a facsimile machine in accordance with another preferred embodiment of the present invention.

Referring to FIG. 21, the main routine of this program has the following configuration. In step S001, setting of originals to be transmitted is detected by sensor 40 (FIG. 14).

In step S002, necessary initial processing is conducted. The control now proceeds to step S003.

In step S003, sensor 42 (FIG. 14) in other words sensors 42a and 42c (FIG. 15) detect the angle $\theta$ made by the leading edge of the original and the main scanning direction, in other words the deviation $\theta$ of the original. The control proceeds to step S004.

In step S004, image information on all the originals set on an original plate (not shown) is read and stored in page memory 76 (FIG. 14). The control proceeds to step S005.

In step S005, the location of the character arrangement region of the original image stored in page memory 76 is detected. The control proceeds to step S006.

In step S006, based on the detected character arrangement region, the direction in which the characters are arranged is detected. Thus, the angle $\theta_1$ made by the direction of character arrangement and the main scanning direction is found. The control then proceeds to step S007.

In step S007, based on the deviation $\theta$ of the original detected by sensors 42a and 42c, coordinate transformation to correct the deviation of the image is conducted. When the angle $\theta_1$ is in the range between −45° to 45°, the result of the correction is written in page memory 78. When the angle $\theta_1$ is in the range between 45° and 135°, the image signal after the correction is written in page memory 80. The control proceeds to step S008.

In step S008, based on the angle $\theta_1$ detected in step S006, the following processing is conducted. When the angle $\theta_1$ is in the range between −45° and 45°, the image signal after the correction has already been stored in page memory 78. Therefore, no further correction processing is conducted. On the other hand, when the angle $\theta_1$ is in the range between 45° and 135°, it will be necessary to further rotate the image by 90°. Microcomputer 62 conducts coordinate transformation by 90° to the image signal stored in page memory 80, and writes the image signal after the transformation into page memory 78. An image signal representing an image as shown in FIG. 17 is stored in page memory regardless of the value of the angle $\theta_1$. The control proceeds to step S009.

In step S009, the data stored in page memory 78 is sequentially read out, coded and transmitted. The program ends with completion of the transmission processing.

Figure 22:
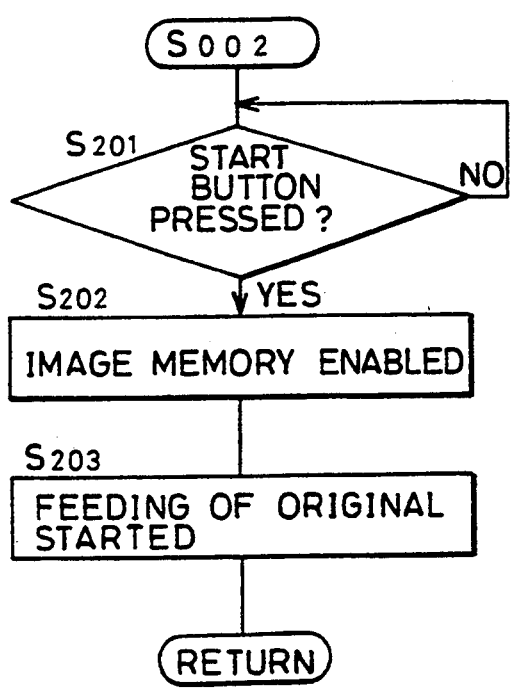
FIG. 22 is a flow chart showing initial processing.

Referring to FIG. 22, in the initial processing in step S002, the following processing is conducted. In step S201, it is determined whether or not a signal representing pressing of a start button is applied from panel controller 66 (FIG. 14). If the result of determination is NO, the control once again returns to step S201, and otherwise the control proceeds to S202.

In step S202, image memories 76–80 are activated to permit writing thereto. The control proceeds to step S203.

In step S203, a signal instructing initiation of feeding of the original is applied to mechanics/recording control circuit 68. In response to this, supply rollers 34 and feed rollers 36 start operating, and after the feeding of the original to the read position is started, the control returns to the main routine.

Figure 23:
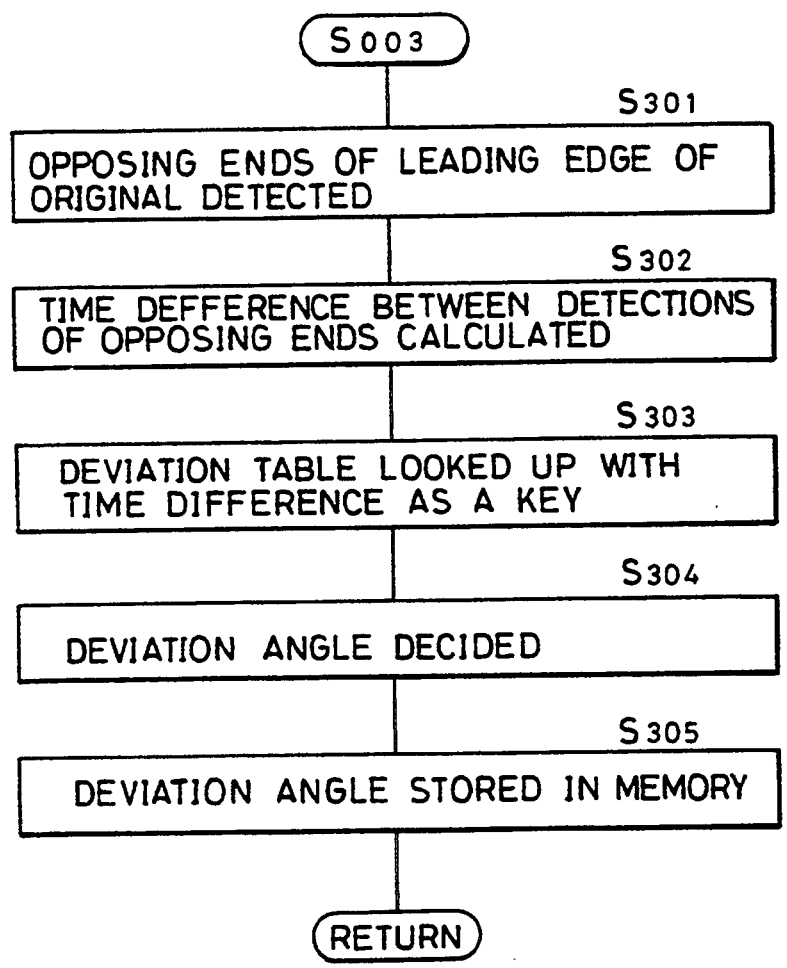
FIG. 23 is a flow chart showing detection processing of the deviation of an original.

Referring to FIG. 23, processing in step S003 is conducted as follows. In step S301, the opposing ends of the leading edge of the original supplied to the reading position is detected by sensors 42a and 42c (FIG. 15), and the program is given information concerning the time of the detection. The control proceeds to step S302.

In step S302, time difference between the detection of the original by sensor 42a and the detection of the original by sensor 42c is produced. The control proceeds to step S303.

In step S303, based on the time difference produced in step S302 and information on the size of supplied original, look up of a deviation table previously stored in an ROM in microcomputer 62 is conducted. As stated above, when the time difference between the detections of the original by sensors 42a and 42c is known, the deviation $\theta$ of the original can be found in accordance with a certain calculation formula. However, often the relation between the time difference and the deviation $\theta$ is previously made into a table and stored in the ROM. Thus, the deviation $\theta$ can be looked up at a high speed by searching the table based on the time difference and the size of the original obtained.

In step S304, the deviation angle $\theta$ to be found is determined from the data stored in the deviation table. The control proceeds to step S305.

In step S305, the obtained deviation angle $\theta$ is stored in the memory in microcomputer 62. The control returns to the main routine.

Figure 24:
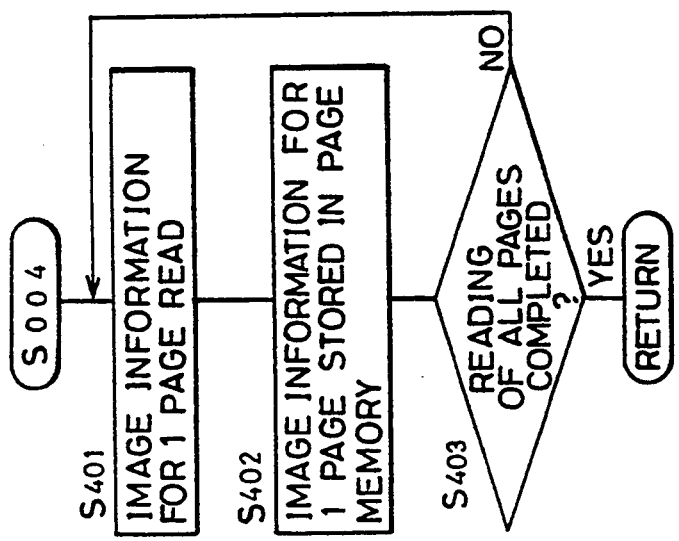
FIG. 24 is a flow chart showing reading of image information.
Figure 26:
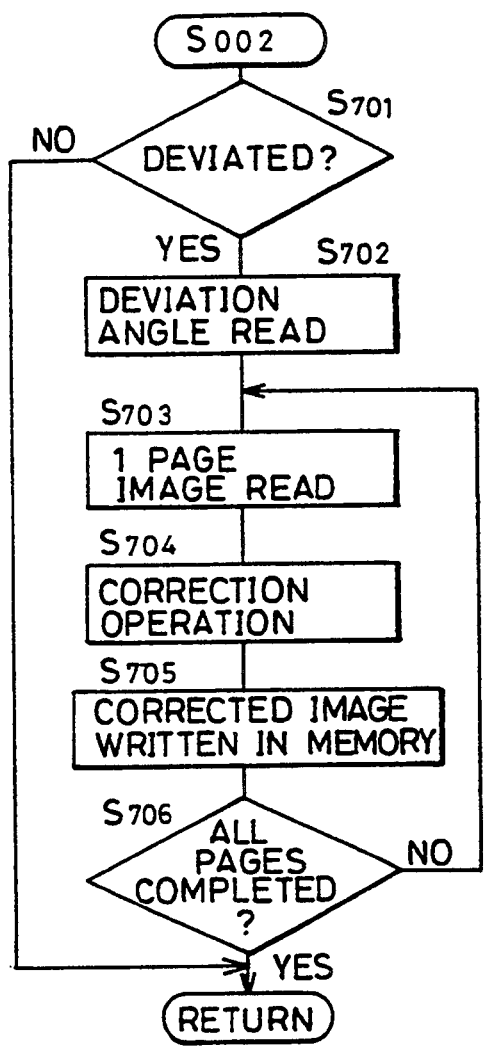
FIG. 26 is a flow chart showing deviation correction.

Referring to FIG. 24, the reading of the image information in step S004 is conducted as follows. In step S401, an original of one page supplied to the reading position separated by rubber plate 38 is converted into image information by CCD 60 and is applied to reading processing circuit 70. The control proceeds to step S402.

In step S402, the image signal for the one page input from reading processing circuit 70 is written in page memory 76. The control proceeds to step S403.

In step S403, it is determined whether or not reading of all the pages is completed. The determination is conducted by detecting the presence or absence of an original to be read next by, for example, original sensor 40. If the answer of determination is NO, the control returns to step S401, and otherwise the control returns to the main routine.

Figure 25:
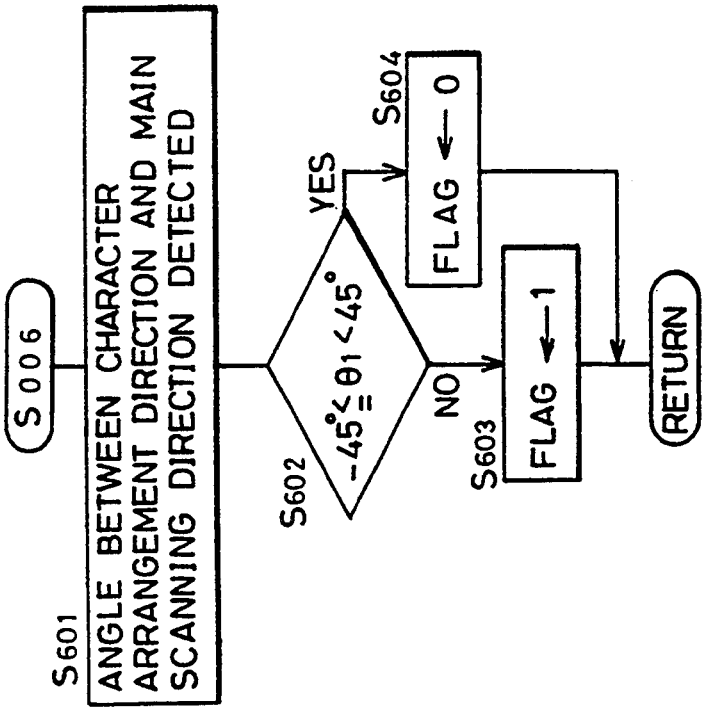
FIG. 25 is a flow chart showing the routine of detecting the direction of character arrangement.

Referring to FIG. 25, the detection of the arrangement direction of the characters in step S006 is conducted as follows. In step S601, the angle $\theta_1$ between the arrangement direction of the characters included in the original image and the main scanning direction is detected. The control proceeds to step S602.

In step S602, it is determined whether or not $\theta_1$ is in the range between $-45°$ and $45°$. If the answer of the determination is NO, the control proceeds to step S603, and otherwise the control proceeds to step S604.

In step S603, 1 is set to a flag prepared in the program and representing the direction of the character strings in the original. The control then returns to the main routine.

If the control proceeds to step S604, 0 is set to the above-stated flag. The control then returns to the main routine.

As can be readily understood, if the flag is 0, the direction of the character strings coincides with the main scanning direction, and if the flag is 1, the direction of the character strings intersects the main scanning direction.

Processing of the deviation correction in step S007 is conducted as follows. In step 701, it is determined whether or not the direction of inserting the original detected by sensors 42a and 42c is deviated. If the answer of the determination is YES, the control proceeds to step S702, and the control otherwise returns to the main routine.

If the control proceeds to step S702, the deviation angle $\theta$ stored in the memory in step S305 in FIG. 23 is read out from the memory. The control proceeds to step S703.

In step S703, reading of the image for one page is conducted from page memory 76. The control proceeds to step S704.

In step S704, correction operation for canceling the deviation angle $\theta$ is conducted to the read image signal. The correction operation is conducted in accordance with a well known formula of coordinate transformation by rotation. The operation is otherwise conducted in accordance with the method shown in U.S. Pat. No. 4,829,452. The control proceeds to step S705.

In step S705, the image signal after the correction is written in page memories 78 and 80. The control proceeds to step S706.

In step S706, it is determined whether or not the correction operation is conducted to the image signals of all the pages of the originals stored in page memory 76. If the answer of determination is NO, the control returns to step S703, and the control otherwise returns to the main routine.

Figure 27:
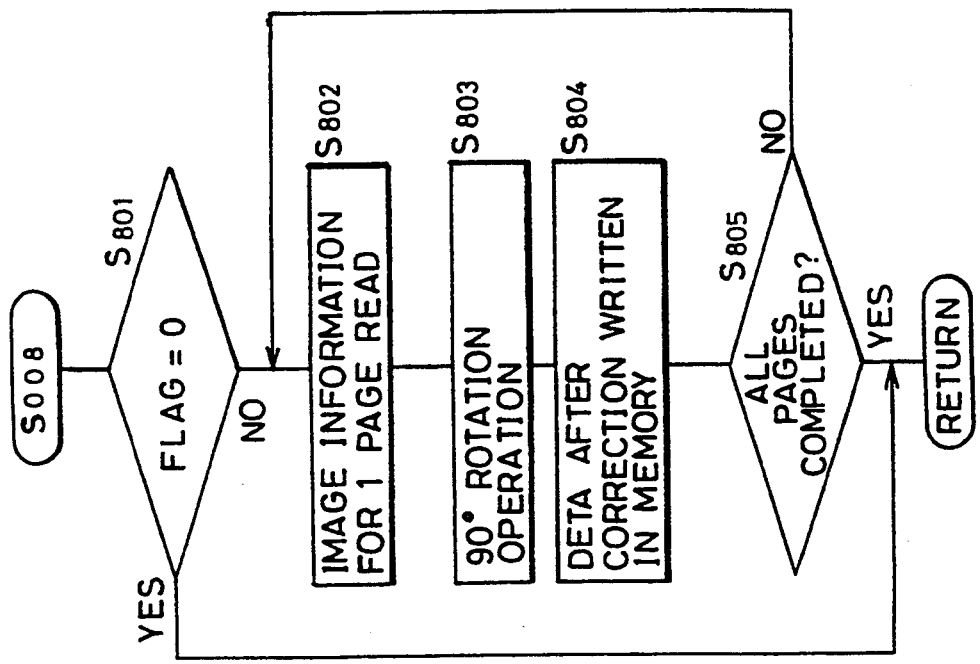
FIG. 27 is a flow chart showing the routine of correcting the direction of character arrangement.

Referring to FIG. 27, the correction of the image signal based on the arrangement direction of the characters in step S008 is conducted as follows. In step S801, it is determined whether or not the value of the flag set in steps S603 and S604 in step S006 is 0. If the answer of the determination in step S801 is YES, the arrangement direction of the characters in the original as stated above approximately coincides with the main scanning direction. The correction processing is therefore not conducted in this case, and the control returns to the main routine. If the answer of the determination in step S801 is NO, the control proceeds to step S802.

If the control proceeds to step S802, it indicates that the arrangement direction of the characters in the supplied original is approximately 90° shifted from the main scanning direction. In step S802, the image signal for one page is read out from page memory 80. The control proceeds to step S803.

In step S803, coordinate transformation operation for rotating the image by the angle of 90° relative to the read image signal is conducted. The control proceeds to step S804.

In step S804, the image signal corrected in step S803 is written in page memory 78. The control proceeds to step S805.

In step S805, it is determined whether or not the correction operation is conducted to the image signals of all the originals stored in page memory 80. If the answer of the determination is NO, the control returns to step S802, and the control otherwise returns to the main routine.

More specifically stated, the conversion of the image signal in steps S007 and S008 is as follows. When the deviation $\theta_1$ is in the range between $-45°$ and $45°$, an image signal formed in page memory 76 represents an image as shown in FIG. 16. In this case, the image signal is converted into a signal representing an original image as shown in FIG. 17 by the correction operation conducted in step S704 in step S007. In this case, the correction of the arrangement direction of the characters in step S008 is not made. Therefore, an image signal representing an original image as shown in FIG. 17 is stored in page memory 78.

On the other hand, with the deviation $\theta_1$ being in the range between 45°–135°, an original image represented by an image signal stored in page memory is as shown in FIG. 18. An image signal representing an original image as shown in FIG. 19 is stored in page memory 80 by the correction operation in step S704 (FIG. 26) in step S007. The image signal as stated above can not be compressed at a high efficiency as it is.

In step S008, the original image 84 shown in FIG. 19 is rotated by 90° and written in page memory 78. The original image stored in page memory 78 is therefore as shown in FIG. 17.

Figure 28:
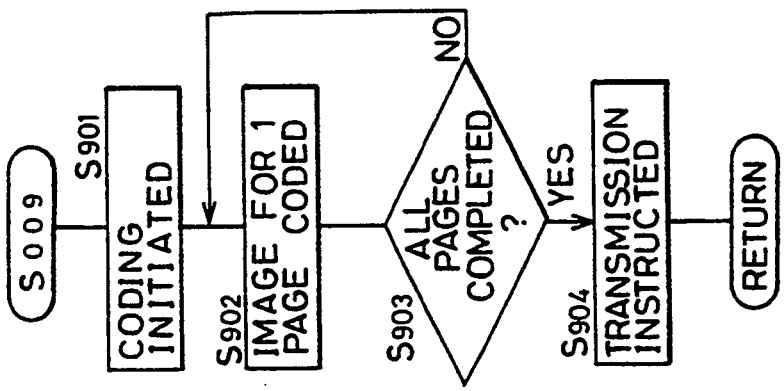
FIG. 28 is a flow chart showing the routine of transmission processing.

The transmission processing in step S009 is conducted as follows. Referring to FIG. 28, in step S901, microcomputer 62 applies a signal instructing initiation of coding to page memory control circuit 74. The control proceeds to step S902.

In step S902, reading and coding of the image signal for the one page from page memory is conducted by page memory control circuit 74. The coded signal is stored in a memory dedicated for transmission (not shown). The control proceeds to S903.

In step S903, it is determined whether or not the coding processing is conducted for all the pages of the originals stored in page memory 78. If the answer of the determination is NO, the control returns to step S902, and otherwise proceeds to step S904.

If the control proceeds to step S904, microcomputer 62 applies to transmission control circuit 72 and modem 30 a signal instructing transmission of the signal compressed and stored in the memory dedicated for transmission onto a telephone line. Transmission control circuit 72 and modem 30 convert the compressed signal stored in the memory dedicated for transmission into an analog signal, and output to the telephone line through LIU 32 in accordance with a prescribed procedure. After the processing in step S904 is completed, the program control returns to the main routine.

The coding processing of the image signal in step S902 is conducted to an image signal representing an original image as shown in FIG. 17. In this original image, the direction in which the character strings extend and the direction in which the signal is read out for coding (the main scanning direction) coincide with each other. The width of the empty row between the adjacent character strings becomes the largest. Coding of the empty row by the above-stated make-up code can therefore be efficiently conducted, thereby increasing the compression efficiency of the entire original as much as possible.

As described above, according to the facsimile machine of the embodiment of the present invention, the angle between the leading edge of an original and the main scanning direction is found from the time difference between the two ends of the leading edge of the supplied original in passing in front of a prescribed sensor. The direction in which the character strings in the original image extend is detected from the original image obtained by the CCD and the reading processing circuit and stored in the page memory. The obtained image signal of the original is subjected to coordinate transformation for correcting the deviation of the original to be transmitted. The coordinate-transformed image signal is further rotated by 90° if necessary so that the direction in which the character strings extend in the original image represented by the image signal coincides with the direction in which the image signal is read out from the page memory in coding processing. Thus, coding of the empty rows between the character strings can be most efficiently coded in coding the image signal after the correction, thereby increasing the compression efficiency of the entire original image as much as possible.

In the foregoing, although the present invention has been described based on particular embodiments, the present invention is by no means limited to the above-stated embodiments. The following embodiment may be employed.

Hardware in a facsimile machine for implementing yet another embodiment of the present invention is identical to that shown in FIG. 14. The embodiment differs from the immediately stated embodiment in the configuration of programs executed by microcomputer 62.

Figure 29:
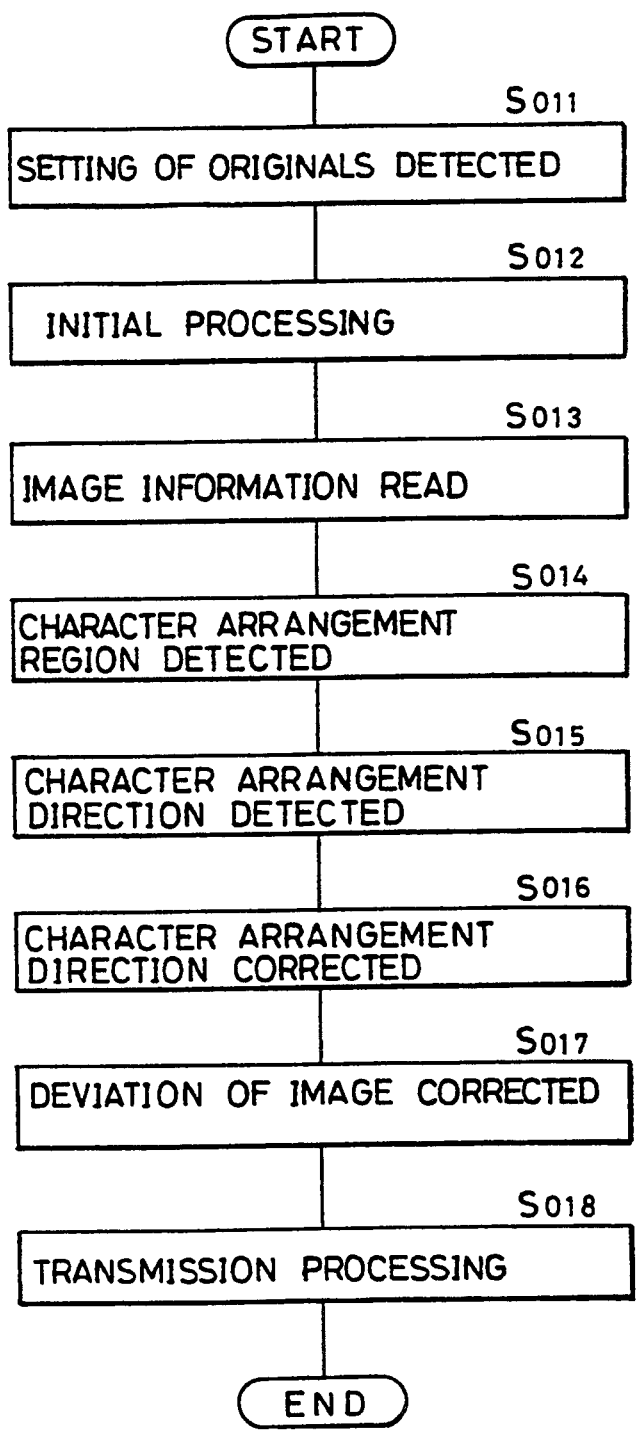
FIG. 29 is a flow chart showing the main routine of a program executed by a microcomputer in a facsimile machine in accordance with yet another preferred embodiment of the present invention.

Referring to FIG. 29, the program executed in microcomputer 62 in the facsimile machine of the present embodiment has the following control configuration. It is detected whether or not originals to be transmitted are placed on an original plate (not shown) in step S011. The processing is identical to the one conducted in step S001 in FIG. 21. The control then proceeds to step S012.

In step S012, necessary initial processing is conducted. The processing is identical to the one conducted in step S002 in FIG. 21. The control then proceeds to step S013.

In step S013, reading of image information on the all the originals set on the original plate is conducted. The processing is the same as the processing conducted in step S004 in FIG. 21. The control proceeds to step S014.

In step S014, the location of the character arrangement region in the read original image is detected. This processing is identical to the processing conducted in step S005 in FIG. 21. The control then proceeds to step S015.

In step S015, the direction in which the character strings extend in the detected character arrangement region is detected. This processing is substantially identical to the processing conducted in step S006 in FIG. 21. However, in step S015, the direction in which the character strings extend is detected more precisely than in the foregoing embodiment. The control proceeds to step S016.

In step S016, the original image is 90° rotated (if necessary) based on the detected direction of the character arrangement so that the character strings are arranged along the direction substantially in coincidence with the main scanning direction. This processing is identical to the processing conducted in step S008 in the foregoing embodiment. The control now proceeds to step S017.

In step S017, the image signal corrected so that the direction in which the character strings after the correction substantially coincide with the main scanning direction is corrected so that the direction in which the character strings extend coincides with the main scanning direction more precisely. This processing is substantially identical to the processing conducted in step S007 in the foregoing embodiment. However, unlike the foregoing embodiment, it is to be noted that the angle for the correction processing is produced from the direction of the character arrangement obtained in step S015 in this case. After the processing of step S017 is conducted to the image signals on all the pages, the program ends.

A program having such a configuration can provide similar effect to the foregoing embodiment. More specifically, according to this embodiment, it is also possible to compress the image signal at a high efficiency regardless of the direction of the original supplied to the facsimile machine.

In this embodiment, the processings in step S016 and step S017 are described as being separate. The present invention is however by no means limited thereto. For example, the program may be produced so as to correct the angle made by the direction of the character arrangement and the main scanning direction obtained in step S015 by one operation processing.

In the above-stated embodiments, the cases have been described in which images including character strings are read. However, the present invention is not limited to these embodiments. As for an image including character rows in which a plurality of not only character strings but also signs and other characters are arranged in a predetermined direction, reading of the image and compression of a signal can be conducted efficiently according to similar procedure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus comprising:
   an image reader including an image sensor and a lens which are moved by a scanning drive for scanning a rectangular original medium and detecting a two-dimensional image reflected from the medium through the lens onto the image sensor and converting the scanned image into two-dimensional image data;

a memory for storing said two-dimensional image data;

correction means for correcting said two-dimensional image data so that the direction of character strings included in said two-dimensional image coincides with a prescribed first direction, said correction means including:

character string direction detection means for automatically detecting the direction of said character strings based on said two-dimensional image data;

skew detection means for detecting skew between the automatically detected direction of said detected character strings and said first direction; and means for electronically rotating said two-dimensional image data so as to cancel said skew;

side angle detection means for detecting the angle made by one side of said original medium and said first direction when said image reader reads said two-dimensional image;

determination means for determining whether an acute angle made by a straight line in the direction of said character strings and a straight line in said first direction is larger than 45°; and image rotation means for electrically rotating said two-dimensional image data based on an output from said side angle detection means and an output from said determination means; and coding means for reading said corrected two-dimensional image data in said predetermined first direction from said memory and coding the read data.

2. The imaging apparatus as recited in claim 1, wherein said image rotation means includes:

first rotating means for conducting coordinate rotation of said two-dimensional image data based on an output from said side angle detection means so that said one side of said original medium is aligned in said first direction, and second rotating means for conducting further coordinate rotation of said two-dimensional image data which is rotated by said first coordinate transformation means so that said two-dimensional image data is rotated by either one of a predetermined first angle and a predetermined second angle.

3. The imaging apparatus as recited in claim 2, wherein
said first angle is 0°,
said second angle is 90°, and
said second rotation means rotates said two-dimensional image data by said second angle only if said acute angle is larger than 45°.

4. The imaging apparatus as recited in claim 2, wherein said one side of said original medium is the leading edge of said original medium, and
said first direction coincides with a main scanning direction of said imaging reader.

5. The imaging apparatus as recited in claim 4, wherein said image reader includes:

a main scanner provided along said main scanning direction for scanning said two-dimensional image on said original medium and outputting an image signal, and a subscanner for supplying said original medium in a subscanning direction intersecting said main scanning direction with said leading edge first so that said original medium passes said main scanner, said side angle detection means includes a pair of leading edge detectors provided along the path of said supplied original medium and a prescribed distance apart from each other for each detecting the leading edge of said medium and outputting a leading edge detection signal, and means for calculating the angle made by the leading edge of said medium relative to said main scanning direction based on a time difference between said leading edge detection signals.

6. An imaging apparatus comprising:

an image reader including an image sensor and a lens which are moved by a scanning drive for scanning a rectangular original medium and detecting a two-dimensional image reflected from the medium through the lens onto the image sensor and converting the scanned image into two-dimensional image data;

a memory for storing said two-dimensional image data;

correction means for correcting said two-dimensional image data so that the direction of character strings included in said two-dimensional image coincides with a prescribed first direction, said correction means including:

character string direction detection means for automatically detecting the direction of said character strings based on said two-dimensional image data;

skew detection means for detecting skew between the automatically detected direction of said detected character strings and said first direction; and means for electronically rotating said two-dimensional image data so as to cancel said skew;

side angle detection means for detecting the angle made by one side of said original medium and said first direction when said image reader reads said two-dimensional image;

determination means for determining whether the angle made by a straight line in the direction of said character strings and a straight line in said first direction satisfies a prescribed relation, wherein said determination means includes means for detecting whether an acute angle made by a straight line in the direction of said character strings and a straight line in the main scanning direction of said reading means is larger than a prescribed first angle; and image rotation means for electrically rotating said two-dimensional image data based on an output from said side angle detection means and an output from said determination means; and coding means for reading said corrected two-dimensional image data in said predetermined first direction from said memory and coding the read data.

7. The image reader as recited in claim 6, wherein said first angle is 45°.

8. The image reader as recited in claim 1, wherein said correction means includes;

determination means for determining whether the angle made by a straight line in the direction of said character strings and a straight line in said first direction satisfies a predetermined relation, and coordination transformation means for conducting coordinate transformation of said two-dimensional image data so as to rotate said image by either one of a predetermined first angle and a predetermined second angle.

9. An imaging apparatus comprising:

an image reader including an image sensor and a lens which are moved by a scanning drive for scanning an original medium and detecting a two-dimensional image reflected from the medium through the lens onto the image sensor and converting the scanned image into two-dimensional image data;

a memory for storing said two-dimensional image data;

correction means for correcting said two-dimensional image data so that the direction of character strings included in said two-dimensional image coincides with a prescribed first direction, said correction means including:

character string direction detection means for automatically detecting the direction of said character strings based on said two-dimensional image data;

skew detection means for detecting skew between the automatically detected direction of said detected character strings and said first direction; and means for electronically rotating said two-dimensional image data so as to cancel said skew;

wherein said correction means includes:

determination means for determining whether an acute angle made by a straight line in the direction of said character strings and a straight line in said first direction is larger than 45°, and coordination transformation means for conducting coordinate transformation of said two-dimensional image data so as to rotate said image by either one of a predetermined first angle and a predetermined second angle; and coding means for reading said corrected two-dimensional image data in said predetermined first direction from said memory and coding the read data.

10. The image reader as recited in claim 9, wherein said first angle is 0°,
said second angle is 90°, and
said coordinate transformation means conducts coordinate transformation so as to rotate said two-dimensional image data by said second angle only if said acute angle is larger than 45°.

11. A facsimile machine, comprising;

an image reader, including an image sensor and lens which are moved by a scanning drive, for scanning a printed rectangular medium, detecting two-dimensional image data, and converting the read data into coded image data, and a transmitter for transmitting said coded image data to another facsimile machine through a communication line, wherein said image reader includes: a memory for storing said two-dimensional image data, correction means for correcting said two-dimensional image data so that the direction of character strings included in said two-dimensional image coincides with a predetermined first direction, said correction means including:

character string direction detection means for automatically detecting the direction of said character strings based on two-dimensional image data, skew detection means for detecting skew between the automatically detected direction of said detected direction of said detected character strings and said first direction, means for electrically rotating said two dimensional image so as to cancel said skew, and side angle detection means for detecting the angle made by one side of said medium and said first direction when said two-dimensional image is read by said image reader, determination means for determining whether the angle made by a straight line in the direction of said character strings and a straight line in said first direction is larger than 45°, and image rotation means for electrically rotating said two-dimensional image data based on an output from said side angle detection means and an output from said determination means so that the direction of said character strings coincides with said first direction, and coding means for reading said corrected two-dimensional image data from said storage means in the order along in said first direction and coding the read data.

12. The facsimile machine as recited in claim 11, wherein
said image rotation means includes;
first rotating means for conducting coordinate rotation of said two-dimensional image data based on the output from said side angle detection means so that said one side of the medium is aligned in said first direction, and
second rotating means for conducting further coordinate rotation of said two-dimensional image data coordinate-transformed by said first rotation means so that said two-dimensional image data is rotated by either one of a predetermined first angle and a predetermined second angle.

13. The facsimile machine as recited in claim 11, wherein
said first angle is 0°,
said second angle is 90°, and
said second rotation means conducts coordinate transformation so as to rotate said two-dimensional image data by said second angle only if said angle between straight lines is larger than 45°.

14. The facsimile machine as recited in claim 12, wherein
said one side of the medium is a leading edge of said medium, and
said first direction coincides with a main scanning direction of said image reader.

15. The facsimile machine as recited in claim 14, wherein
said image reader includes:
main scanner provided along said main scanning direction and for scanning the two-dimensional image on said medium and outputting an image signal, and
a subscanner for supplying said medium in subscanning direction intersecting said main scanning direction with said leading edge first so that said medium passes on said main scanner,
said side angle detection means including;
a pair of leading edge detectors provided along the path of said supplied medium and a prescribed distance apart from each other in said main scanning direction for each detecting the leading edge of said medium and outputting a leading edge detection signal, and
means for calculating the angle between the leading edge of said medium and said main scanning direction based on a time difference between said leading edge signals.

16. A facsimile machine, comprising:

an image reader, including an image sensor and lens which are moved by a scanning drive, for scanning a printed medium, detecting two-dimensional image data, and converting the read data into coded image data, and a transmitter for transmitting said coded image data to another facsimile machine through a communication line, wherein said image reader includes: a memory for storing said two-dimensional image data, correction means for correcting said two-dimensional image data so that the direction of character strings included in said two-dimensional image coincides with a predetermined first direction, said correction means including:

character string direction detection means for automatically detecting the direction of said character strings based on two-dimensional image data, skew detection means for detecting skew between the automatically detected direction of said detected direction of said detected character strings and said first direction, and means for electrically rotating said two dimensional image so as to cancel said skew, and coding means for reading said corrected two-dimensional image data from said storage means in the order along in said first direction and coding the read data, wherein said correction means further includes:

determination means for determining whether the acute angle made by a straight line in the direction of said character strings and a straight line in said first direction, and coordinate transformation means for conducting coordination transformation so as to rotate said two-dimensional image data by one of a predetermined first angle and a predetermined second angle based on the output of said determination means.

17. The facsimile machine as recited in claim 16, wherein said first angle is 0°, said second angle is 90°, and said coordinate transformation means conducts coordinate transformation so as to rotate said two-dimensional image data by said second angle only if said acute angle is greater than 45°.

* * * * *